(12) United States Patent
Camiel

(10) Patent No.: US 8,302,178 B2
(45) Date of Patent: *Oct. 30, 2012

(54) SYSTEM AND METHOD FOR A DYNAMIC POLICIES ENFORCED FILE SYSTEM FOR A DATA STORAGE DEVICE

(76) Inventor: Noam Camiel, Tel-Aviv (IL)

( * ) Notice: Subject to any disclaimer, the term of this patent is extended or adjusted under 35 U.S.C. 154(b) by 1128 days.

This patent is subject to a terminal disclaimer.

(21) Appl. No.: 11/884,034

(22) PCT Filed: Mar. 2, 2006

(86) PCT No.: PCT/IL2006/000287
§ 371 (c)(1),
(2), (4) Date: Aug. 9, 2007

(87) PCT Pub. No.: WO2006/095335
PCT Pub. Date: Sep. 14, 2006

(65) Prior Publication Data
US 2008/0229428 A1    Sep. 18, 2008

Related U.S. Application Data

(60) Provisional application No. 60/658,568, filed on Mar. 7, 2005.

(51) Int. Cl.
*G06F 7/04* (2006.01)
*G06F 9/00* (2006.01)
*H04L 29/06* (2006.01)

(52) U.S. Cl. ............... 726/11; 726/2; 726/26; 713/165

(58) Field of Classification Search ............ 726/27, 726/2, 11, 26; 713/165
See application file for complete search history.

(56) References Cited

U.S. PATENT DOCUMENTS

| | | | | |
|---|---|---|---|---|
| 5,410,707 | A   * | 4/1995  | Bell          | 713/2   |
| 5,931,947 | A    | 8/1999  | Burns         |         |
| 6,405,323 | B1 * | 6/2002  | Lin et al.    | 714/8   |
| 6,427,186 | B1 * | 7/2002  | Lin et al.    | 711/103 |
| 6,615,324 | B1 * | 9/2003  | Fernald       | 711/153 |
| 7,023,853 | B1 * | 4/2006  | Bechtolsheim et al. | 370/392 |
| 7,054,990 | B1 * | 5/2006  | Tamura et al. | 711/103 |
| 7,124,152 | B2 * | 10/2006 | Fish          | 1/1     |
| 7,134,006 | B2 * | 11/2006 | Flanigan      | 713/1   |
| 7,200,706 | B2 * | 4/2007  | Endo          | 711/100 |
| 2001/0011337 | A1 * | 8/2001 | Shamshirian   | 711/163 |

(Continued)

OTHER PUBLICATIONS

International Preliminary Report on Patentability Dated Sep. 20, 2007 From the International Bureau of WIPO Re.: Application No. PCT/IL2006/000287.

*Primary Examiner* — Mohammad W Reza

(57) ABSTRACT

An autonomous data storage device for storing data files via an external file interface, the external file interface being controllable from an external device, the device comprising: a physical file storage for homogenous storage of files; the external file interface configured to allow sector level access to at least part of the physical file storage to support standard operating file system calls; an internal sector policy management unit located in between the external file interface and the physical file storage for sector level policy enforcement of the physical file storage, for one or more of the sector level managed sectors, the unit having an input for receiving instructions from the external file interface for sector oriented operations, and being configured to carry out sector policy management operations in accordance with.

35 Claims, 17 Drawing Sheets

U.S. PATENT DOCUMENTS

| | | | |
|---|---|---|---|
| 2002/0013879 A1* | 1/2002 | Han | 711/103 |
| 2003/0173400 A1* | 9/2003 | Morita et al. | 235/380 |
| 2004/0015723 A1 | 1/2004 | Pham et al. | |
| 2005/0193182 A1* | 9/2005 | Anderson et al. | 711/163 |
| 2005/0216685 A1* | 9/2005 | Heden et al. | 711/163 |
| 2006/0064605 A1* | 3/2006 | Giobbi | 713/193 |
| 2006/0123093 A1* | 6/2006 | Kawamura | 709/206 |
| 2006/0136663 A1* | 6/2006 | Cochran et al. | 711/112 |
| 2006/0168472 A1* | 7/2006 | Chen | 714/6 |

* cited by examiner

SYSTEM AND METHOD FOR A DYNAMIC POLICIES ENFORCED FILE SYSTEM FOR A DATA STORAGE DEVICE

RELATED APPLICATIONS

This Application is a National Phase of PCT Patent Application No. PCT/IL2006/000287 having International Filing Date of Mar. 2, 2006, which claims the benefit of U.S. Provisional Patent Application No. 60/658,568 filed on Mar. 7, 2005. The contents of the above Applications are all incorporated herein by reference.

FIELD AND BACKGROUND OF THE INVENTION

The present invention relates to securing digital material in a general purpose media device, and, more particularly but not exclusively to a small portable data storage media device such as a flash disk. The secured material is of the type which it is not desired that the user access directly, alter or copy. Examples of such material or files are copyright material, payment applications (electronic wallet), gaming, protected software, password protected documents etc.

A digital storage unit such as a computer hard disk, a flash card or a key-chain storage device etc. will be referred to herein as a digital storage device, or a media device. The use of non-volatile digital storage grew rapidly with the advancement of the computer market, and the requirement for mobile non-volatile storage has grown with the increased use of computer laptops. Furthermore with the requirement for larger capacities for multimedia players such as the Ipod player by Apple (www.apple.com/ipod) the requirement for digital storage continues to grow. Devices such as digital cameras and mobile phones use non-volatile memory cards such as flash-cards by Sandisk (www.sandisk.com) to store images and other data. Other devices of the key-chain storage family by M-Systems (www.m-sys.com) include USB connectivity so that the storage device can act as a floppy disk replacement. A media device, unlike a floppy disk, includes a controller with some ram, and/or rom or other memory. The controller and memory are needed as these media devices become more complex, and for managing the device transparently to the appliance, for example in order to hide media defects.

In the discussion that follows, a sector is referred to as the smallest unit of independently addressable memory space in a media device, normally containing 512 bytes. A media device, such as a computer hard drive, was historically accessed by specifying the drive's Cylinder number, Head number, and Sector number (CHS). This is also referred to as accessing a drive through its "geometry", where a hard drive has one or more cylinders, one or more heads to read/write, and a sector number within a specific cylinder and head that contains the stored data. A new method for addressing sectors is called Logical Block Addressing or LBA, where instead of referring to a drive's cylinder, head and sector number geometry, each sector is assigned a unique number. In essence, LBA is a method by which a drive is accessed by linearly addressing sector addresses. The LBA method is used for general media devices and will be used herein to define a virtual address in a media device. The digital appliance, such as a computer, may use one of several file systems to format and make use of the media device. This flexible usage is made possible through the sector level access of a media device. The purpose of a media device is usually to store data for its user or users. In cases where a permission system was necessary to protect one user's files from another user, such as in a multi-user environment, the permission enforcement has been a software security policy, generally managed by the computer administrator. The computer administrator uses available functions of an application using the device, such as an operating system of a computer, to enforce a permission system. The disadvantage in using such systems is that an administrator is needed, with all the accompanying security weaknesses. An alternative approach to a security policy for mobile devices was introduced to protect private and confidential files in case the mobile media device is lost or stolen. In such a case a software security policy is insufficient, as the holder of the storage media device can bypass the software permission policy in various ways. The user can, for example, become an administrator on his own computer and read the content of all connected media devices when file permission policy is enforced by the host computer. Another approach to security policy where file content is not directly accessible to the user, is the use of digital Rights Management or DRM. DRM is a technique for offering protection over copyright digital content. Some protection schemes may include limitation on the access to the digital content, such as limiting the amount of time that content may be accessed, limiting the number of times content may be accessed and so forth. In the case of copyright content under DRM, the content is not accessible to the user directly. For example, the user is not able to duplicate the content. U.S. Patent Application No. 20040039932 to Elazar et al discloses a system for securing digital documents in a digital appliance, hereinafter Elazar et al. In Elazar at al, a DRM device is described which has computational power and its own non-volatile storage for managing and performing its DRM. The above solution however is problematic when the device has more than the single purpose of serving the DRM, for example in media devices which are used both for DRM purposes and as general purpose storage devices. One solution involves dividing the device into two regions or zones. One zone, which is inaccessible to the user, is used by the DRM device. We will refer to this zone as the hidden DRM zone. The other zone is accessible to the user, and there the user can store his or her data. The Sandisk internet site http://www.sandisk.com/retail/booklocker.asp mentions that in their product "booklocker", "Copyrighted content is stored in a separately partitioned secure zone in the flash drive, which is inaccessible to the user. An open zone on the drive may be used by the user for other purposes." The solution of dividing the media into two zones causes several problems. These problems arise due to the static nature of the two zones. For example, when one zone fills up the user may be confused as the memory available to him is less than the memory size declared on the device. Furthermore, free space in the hidden zone may not be viewed or managed by the user. The hidden zone may not be used for user files and, similarly, the user free space may not be used for secure data files. U.S. Patent Application No. 20030173400 to Morita et al, hereinafter Morita et al, discloses a storage card with an integral file system, access control and cryptographic support. In Morita et al, the described media device does not allow sector level access for the appliance to which the media device is connected. Instead the media device responds to file access commands. The approach of Morita et al protects file contents against unauthorized use. However the use of a media device as a standard storage device is limited, because the device does not offer sector level access and therefore cannot to be formatted with a standard file system that can be mounted by the host appliance, such as a computer. This means that special drivers are necessary to be in place in order to use the device as for storage. Furthermore, a proprietary file system implementation has to be implemented on the media device, a property that is undesirable.

There is thus a widely recognized need for a media device that can store both user files and protected files securely and efficiently, and it would be highly advantageous to have such a system devoid of the above limitations.

SUMMARY OF THE INVENTION

According to one aspect of the present invention there is provided an autonomous data storage device for storing data files via an external file interface, the external file interface being controllable from an external device, the autonomous data storage device comprising:

a physical file storage;

said external file interface configured to allow sector level access to at least part of said physical file storage to support standard operating file system calls;

an internal sector policy management unit located in between said external file interface and said physical file storage for sector level policy enforcement of said physical file storage, for at least part of respective sector level managed sectors, said unit having an input for receiving instructions from said external file interface for sector oriented operations, and being configured to carry out sector policy management operations in accordance with management rules for said sector level policy enforcement.

According to a second aspect of the present invention there is provided an autonomous data storage device for storing data files via an external file interface, the external file interface being controllable from an external device, the autonomous data storage device comprising:

a physical file storage;

an external file interface allowing sector level access to at least part of said physical file storage to support standard operating file system calls;

an internal processor, an internal file name analyzer configured to receive a file name from the external device and obtain location information corresponding to the file name from a directory area in the memory;

an internal sector driver, coupled to the file name analyzer, configured to receive location information from the file name analyzer and obtain data corresponding to the file name in the memory; and an internal file management unit comprising a decryptor, the internal file management unit having an input for receiving instructions from said external file interface for file management operations, and arranged such that said internal module, internal processor and decryptor decrypt and process data files within user data memory files in accordance with file management rules held by said internal file management unit, and support operating system file calls.

According to a third aspect of the present invention there is provided a method of interfacing between files, some of which have restricted access conditions, some of said restricted access condition files being encrypted, and an external device, the method comprising:

storing said files homogenously, b. identifying said stored files as either unrestricted user files or restricted access files or restricted access encrypted files, c. allowing full file accessibility functionality for the unrestricted and encrypted user files, whilst restricting file accessibility functionality for the restricted unencrypted files.

According to a fourth aspect of the present invention there is provided file storage apparatus comprising:

a plurality of physical memory units for storing data files, some of said data files being associated with an access restriction policy and some of said files being designated for free access, and a file management unit, wherein said file management unit is configured to store said data files in said memory units, and for each memory unit to set a memory unit access policy according to the respective access designation of the correspondingly stored file.

According to a fifth aspect of the present invention there is provided file storage device for storing files sectorially for subsequent access, the device comprising:

an externally accessible interface for accessing said files, and an internal inaccessible interface located above said sector level access to limit access to certain files according to an indication associated with a respective file of a file access restriction.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

Figure 1A:
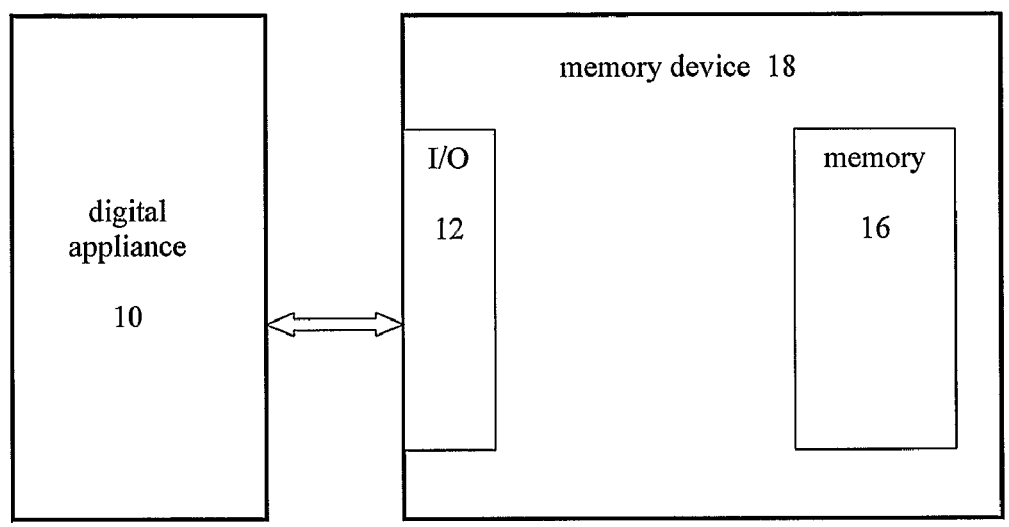
FIG. 1A is a block diagram illustration of a basic media storage device connected to a digital appliance, according to an embodiment of the present invention.

It will be appreciated that, for simplicity and clarity of illustration, elements shown in the figures have not necessarily been drawn to scale. For example, the dimensions of some of the elements may be exaggerated relative to other elements for clarity. Furthermore, where considered appropriate, reference numerals may be repeated among the figures to indicate corresponding or analogous elements.

DESCRIPTION OF THE PREFERRED EMBODIMENTS

The preferred embodiments teach an autonomous data storage device for storing data files via an external file interface. Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The present invention includes several embodiments that can be realized using the autonomous data storage device described herein. In this disclosure, an autonomous data storage device for storing data files via an external file interface is described, where the external file interface is controllable from an external device such as a computer to which it is connected via a data link such as a USB. The autonomous data storage device further comprises a physical file storage such as flash memory, and an internal file management system. The internal file management system interfaces between the external file interface and the physical file storage. The internal file management system receives instructions from the external file interface and performs respective file management operations according to the received instructions, and file management rules that are stored in the data storage device. The file management rules, or access policies, are determined at the time of storing the files in the memory device, but may later be changed dynamically.

FIG. 1A is a simplified block diagram of an autonomous data storage device according to an embodiment of the present invention. It shows a data storage device 18 such as a disk on key, comprising a memory unit 16, an internal i/o interface 12, an external i/o interface, and a digital appliance 10 to which the data storage device is connected. The digital appliance, such as a computer, communicates with the data storage device. The digital appliance can upload and download files to and from the data storage device, can obtain information about the stored files, free space on the device, and optionally implements access control to the stored files etc.

Figure 1B:
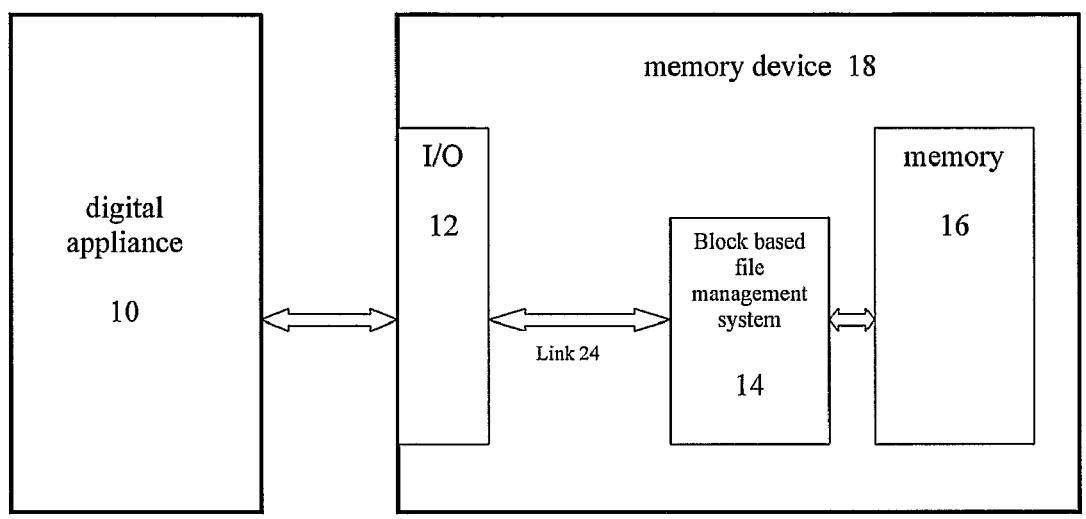
FIG. 1B is a block diagram illustration of a basic media storage device connected to a digital appliance, where memory can only be accessed through a file management system, according to an embodiment of the present invention.

FIG. 1B is a simplified block diagram of an autonomous data storage device according to an embodiment of the present invention. In this diagram, a memory device 18 is connected to a digital appliance 10 such as a computer through an i/o interface 12. The autonomous data storage device has a memory unit 16 in which both secure and non-secure files may be stored together. The digital appliance can access the memory directly, and so can the block based file management system 14. The file management system has independent access to the memory, and may have additional capabilities for handling restricted content, capabilities which may not be available to the digital appliance.

In another embodiment of the present invention, files stored in the autonomous data storage device are accessible only via the internal file management system. This means that the external appliance connected to the autonomous data storage device does not have direct access to the storage memory of the autonomous data storage device. This has the advantage of added security as the stored files cannot be physically accessed directly by the digital appliance. This is illustrated in FIG. 1B, according to an embodiment of the present invention. This prevents any direct connection between the digital appliance and the memory. All access to the memory has to go through the file management system. A setup such as this provides extra security to the stored files and makes hacking etc. far more difficult as the hacker now has to go through the file management system to get at the restricted files. In a further embodiment of the present invention, the external device cannot access the internal file management system. This adds to the security of the autonomous data storage device, as a user cannot tamper with the internal file management system and try to circumvent one or more of the file management rules, and thus gain unauthorized access to secure files. The autonomous data storage device has a memory unit 16 in which both secure and non-secure files may be stored together. When files are stored in the data storage device, access policies are set to determine the accessibility of the files. The access policies are set according to the location of the file in the physical memory, i.e. according to the LBA (logical block address) occupied by the file. A file management system 14, controls the access to these files, allowing free access to non secure files but applying strict controls to the access of secure files. The file management system examines the access policies as they have been set at each LBA before determining whether to grant access to it. The access policies themselves are determined by owner or distributor of the files, and they are designed to protect secured files such as copyrighted files from being illegally used or duplicated. The internal file management system receives instructions for file management operations through the external file interface 12. Examples of such instructions are: read LBA, write LBA, secure file, erase secure file etc.

Another embodiment of the present invention is an autonomous data storage device where the physical file storage is homogeneous. This leads to more flexibility and simplicity in the management of the physical storage. When the physical file storage is not homogeneous, managing the physical storage requires special treatment for each part of the physical storage. Furthermore, certain files may not be stored in certain parts of the physical storage, thus reducing the flexibility of managing the physical storage.

Figure 1C:
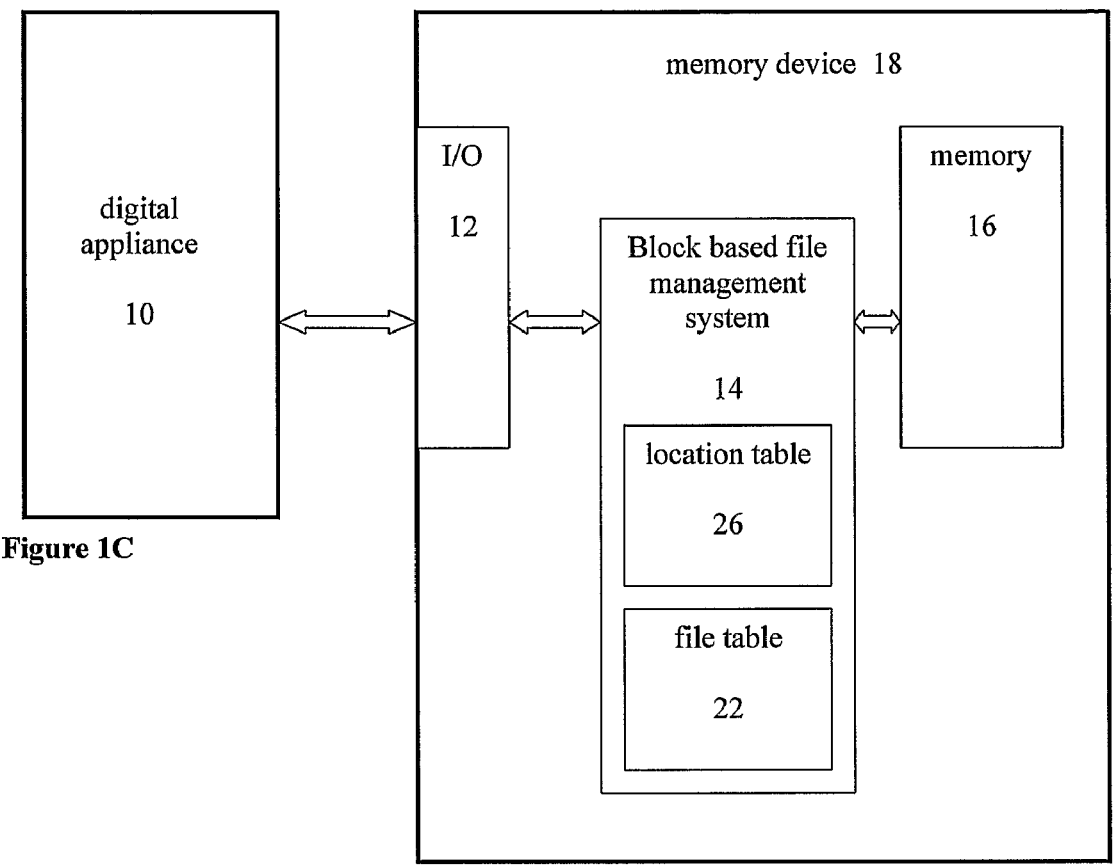
FIG. 1C is a block diagram illustration of a basic media storage device that includes a file table, according to an embodiment of the present invention.

Referring now to FIG. 1C, this figure is similar to FIG. 1B, except that the block based file management system is shown in greater detail to have a file table 22 and a location table 26. The file table holds relevant information concerning the stored files, information such as file LBA location, file status, file availability etc. The location table holds permission values for each LBA location in memory 16. The file management system uses the information stored in the file table in the process of determining access to stored files. In a further embodiment of the present invention, file management rules define file access levels for respective files. These rules define, for example, which files the user will be able to access, in what format will the files be accessible, for what period of time will they be accessible, the number times a file may be accessed etc. The format permitted may be of a type that is usable but not storable, for example formats that are specific to output devices such as for screen or speaker. The accessibility may be time limited such that a file is only accessible, for example for one week, after which a user has to obtain renewed access privileges. Similarly, the number of times a user accesses a file may be limited, and after a user accesses a file a specified number of times, renewed accesses privileges are required and must be obtained by the user.

Preferably, the device uses an address definition of logical block addresses (LBA) in the file table file. Thus the accessibility of the file is determined by its location in the physical file storage area, and whether this location is defined as accessible or inaccessible in the location table 26 This use of LBAs to define file accessibility enables accessible files to be stored alongside inaccessible files in the same homogeneous physical file storage.

A further embodiment of the present invention is the use of encryption to further protect stored, restricted access files. Files may be stored in an encrypted form so that if unauthorized access to a restricted file is obtained, the file will be useless unless the unauthorized user has the means to decrypt the file. The internal file management system decrypts restricted access files before making them available to authorized users.

In another embodiment of the present invention the internal file management system includes decryption keys so as to decrypt previously encrypted restricted access files, before releasing them to authorized users. Clearly, without such decryption keys, file decryption is very difficult.

In another embodiment of the present invention the autonomous data storage device includes a decryption/validation module. This module checks and validates encrypted files before storing them, a necessary operation since if a corrupted restricted access file is stored, it may cause a security hole or a malfunction of the internal operation of the file management system. In addition, repairing the damage or reloading the file is not a simple operation.

In another embodiment, the internal file management system allows the user to erase a file, whether that file is accessible or not. This is advantageous because it allows the user to free needed storage space on the autonomous data storage device. Furthermore, if the internal file management system finds a file to be inconsistent, it will erase the file and free the storage space for other files.

In another embodiment, the internal file management system determines the usability of a limited access file before granting access to it. The internal file management system does this by checking a status flag relating to the limited access file. The status flag is a flag indicating the status of the respective file and can have values such as "available", "pending" etc. The status flag is stored in the file table previously described.

In another embodiment, the internal file management system determines the permission of a limited access file before granting access to it. The internal file management system does this by checking the permission relating to the limited access file with that of the permission level of the requesting entity. Entities that make use of limited access files may be internal or external to the media device.

In a further embodiment, the autonomous data storage device downloads files from a remote server connected to a network through a digital appliance such as a computer which is also connected to the network. (See FIG. 9). The file storage process is managed according to a security policy defined by the server, and according to the security policies defined in the autonomous data storage device. In other words, the server that provides the file to the autonomous data storage device also determines the accessibility of that file.

In another embodiment, the internal file management system grants a user access to an encrypted file even if the file is a limited access file. However, the file is made available to the user in an encrypted form. In this way a user may copy and store the encrypted file, but he cannot use it without the respective decryption key.

In another embodiment the autonomous data device generates usable presentation copies of limited access files for the external device to read. These files are usable by the external device, but the files are in a format which is inconvenient for storage or onward transmission and the like.

In another embodiment, for added security, encrypted files are decrypted sector by sector or block by block. Each decrypted sector or block is presented to the user, or processed internally by the file management system and then erased. This method is also called "decryption on-the-fly". In this way there is never a fully decrypted version of the file.

Some examples of such output are books, sound or video output. In the example of books output, books may be composed of data images representing each page and a separate book text file for searching purposes. A book page is displayed by outputting a book page image, such as in BMP or JPG format. A text search is made within the storage device through the use of the book text file which is inaccessible to the user. Upon completing a search request by the user, only the found text location is output back to the user. In the example of sound output the storage device may allow the digital device to play some audio restricted access files in such a way that the digital device is unable to store and replay the restricted access audio files at a later time without the storage device. One possible way of implementing this is that the policy enforcer in the storage device inserts a code into the audio file. The code will allow the audio file to be replayed only if a matching code is supplied by the storage device at the time the file is to be replayed. The storage device supplies the matching code according to the security policy of the audio file. Another possible way of implementing this is that the policy enforcer in the storage device outputs the audio data at a live playing rate much like music over the internet is played. The audio signal may sometimes be degraded, simulating network congestion, and it may also be distorted. The audio signal may also be decompressed by the device. Following audio signal decompression, the signal may be distorted by the device. Recompression of the audio signal may cause additional loss of quality. A digital watermark containing specific user device information may be placed on audio signal content. A similar method may be used for other media files such as video.

Another example of video output is where the digital storage device outputs a series of large bitmap files suitable for video display, but inconvenient to store because of their size. Bitmap files are files that define how each screenshot appears. The files are large, usually over 1 megabyte per file, and are required at a rate of about 25 files per second, which is the rate required for a smooth video display. Storing such files is clearly not convenient as a very large memory capacity is required for even a short video clip. For example, a five minute video clip stored as bitmap files requires $1 \times 25 * 60 * 5 = 7.5$ gigabytes.

In another embodiment, the autonomous data device generates outputs based on limited access files for the external device to use. These files are usable by the external device, but do not allow reading them or altering them. Some examples are software copy protection and electronic wallet applications. In the example of software copy protection, portions of algorithm code and/or data may be stored in secured files. The internal policy enforcer may output data based on the algorithms code, hidden data, and current digital appliance input parameters. The output data is necessary for the software to function correctly. In the example of an electronic wallet, the internal policy enforcer can output information based on input from the external digital appliance and internally protected data that represents electronic money. The internal policy enforcer may manipulate and use the protected data based on the digital appliance input, but the digital appliance may not manipulate the protected data representing electronic money.

In another embodiment, the internal file management system changes dynamically the accessibility status of a file from limited access to user file and vice versa. Such change of status is normally done only according to a security policy defined by the same server that downloaded the file to the autonomous data storage device, and according to the security policies defined in the autonomous data storage device.

In another embodiment, access to stored files is determined by the API used, where the system has a plurality of APIs. (See FIG. 2). One API is privileged to read a limited access file while another API is not. APIs are given access to limited access files according to file permissions and the security policies defined in the autonomous data storage device.

In another embodiment, the API contains a token for added security. This token is, for example, a secret code hidden from the user. Upon activation of the API, the file management system examines and validates the token before granting access to the respective protected file according to the defined security policy for that file. The token in the API may also take the form of a password. In this case, upon activation of the API the file management system asks the user to type a password. The password is then verified before granting access to the respective protected file according to the defined security policy for that file.

In another embodiment of this disclosure, the file status flag is checked before access to that file is given by the policy enforcer. As described previously, the internal file management system does not give access to files with status "pending" or "inconsistent" etc., but it may give access to files with status "available".

The principles and operation of a secured storage media device according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments and of being practiced or carried out in various ways. Also, it is to be understood that the phraseology and terminology employed herein is for the purpose of description and should not be regarded as limiting.

In the following detailed description, numerous specific details are set forth in order to provide a thorough understanding of the invention. However, it will be understood by those of ordinary skill in the art that the present invention may be practiced without these specific details. In other instances, well-known methods, procedures and components have not been described in detail so as not to obscure the present invention. The present embodiments describe an autonomous data storage device for storing data files via an external file interface, where the external file interface is controllable from an external device such as a computer. Files are stored in the memory unit, and access to the stored files is governed by a set of user policies, policies enforced by the file management system.

The advantage of the present embodiments is to provide a way of using a single, standard file system to support the enforcement of several user policies for managing the access to files in the media device. Thus through the user's file system, files in the media device can be accessed and listed just like any other user file. However not all file contents are accessible by any user. The accessibility of each file depends upon the access policy of the entity attempting to access the file. An entity may be external or internal to the device. The access policy for each file (through its LBA) is managed dynamically. This means that a file may first be copied into the user area, and then its policy may be changed dynamically by the policy enforcer. Furthermore, a file of a policy which is not readable by the user may still be erased by the user so that the user can use its freed space for other purposes.

In the description herein below, the term "physical user media" refers to the storage that is available to the user through the digital appliance when using a media device.

Figure 2:
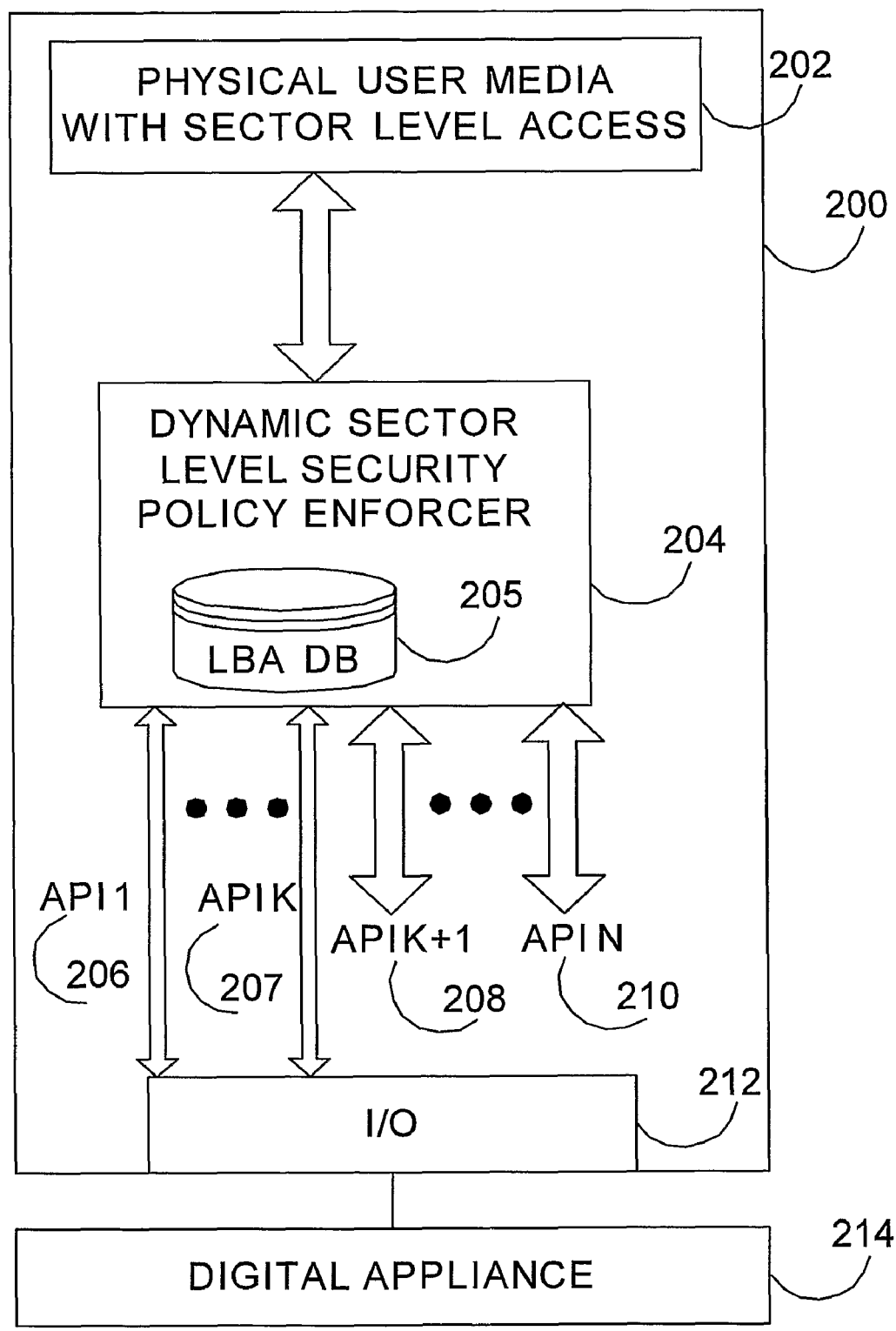
FIG. 2 is a block diagram illustration of a media device with dynamic security policy enforcement connected to a digital appliance, according to an embodiment of the present invention.

Reference is now made to FIG. 2, which is a block diagram illustration of a media device with dynamic sector level security policy enforcement connected to a digital appliance, in accordance with an embodiment of the present invention. The media device 200 is connected to a digital appliance 214, and comprises a physical user media with sector level access 202, a dynamic sector level security policy enforcer 204 which will be referred to herein as policy enforcer, and an I/O module 212. The policy enforcer 204 includes an LBA database 205 containing a matching policy entry for each sector in user media 202, and supports several different sets of external API calls 206, 207, 208, 210 etc. An API is an application program interface. Various users, internal programs and internal device units are assigned different APIs to access the media device, and it is according to these APIs and requested sector that the policy enforcer determines which user or internal program may access which sector. When a user, internal program or internal unit of the device uses an API to access a sector, that API makes an API call to the policy enforcer, informing it of the request. The policy enforcer then decides on what action to take, depending on the API call and the request made. The policy enforcer makes the decision using the information in the LBA database. The LBA database contains a matching policy entry for each block or sector in user media, which includes an access permission entry for each API. The user physical media 202 refers to the media that may be accessed and used by the digital appliance 214, and may be accessed through LBA addressing, as previously explained. The policy enforcer 204 manages access to the user physical media 202 depending upon the LBA that is accessed, the operation requested and the API that is used for access. The security policy for each LBA may be changed dynamically through the digital appliance 214 using the correct API. This is done by making changes to entries within the LBA database in the policy enforcer.

Illegal access to the security policy enforcer 204 in order to attempt to change the security policies of restricted access files is always a danger. As can be seen in FIG. 2, the policy enforcer 204 is inaccessible by the digital appliance. The only way to communicate with the policy enforcer is through the APIs, and this fact adds another measure of security to the device. Other security measures such as encryption are also possible, and are discussed later.

Figure 3:
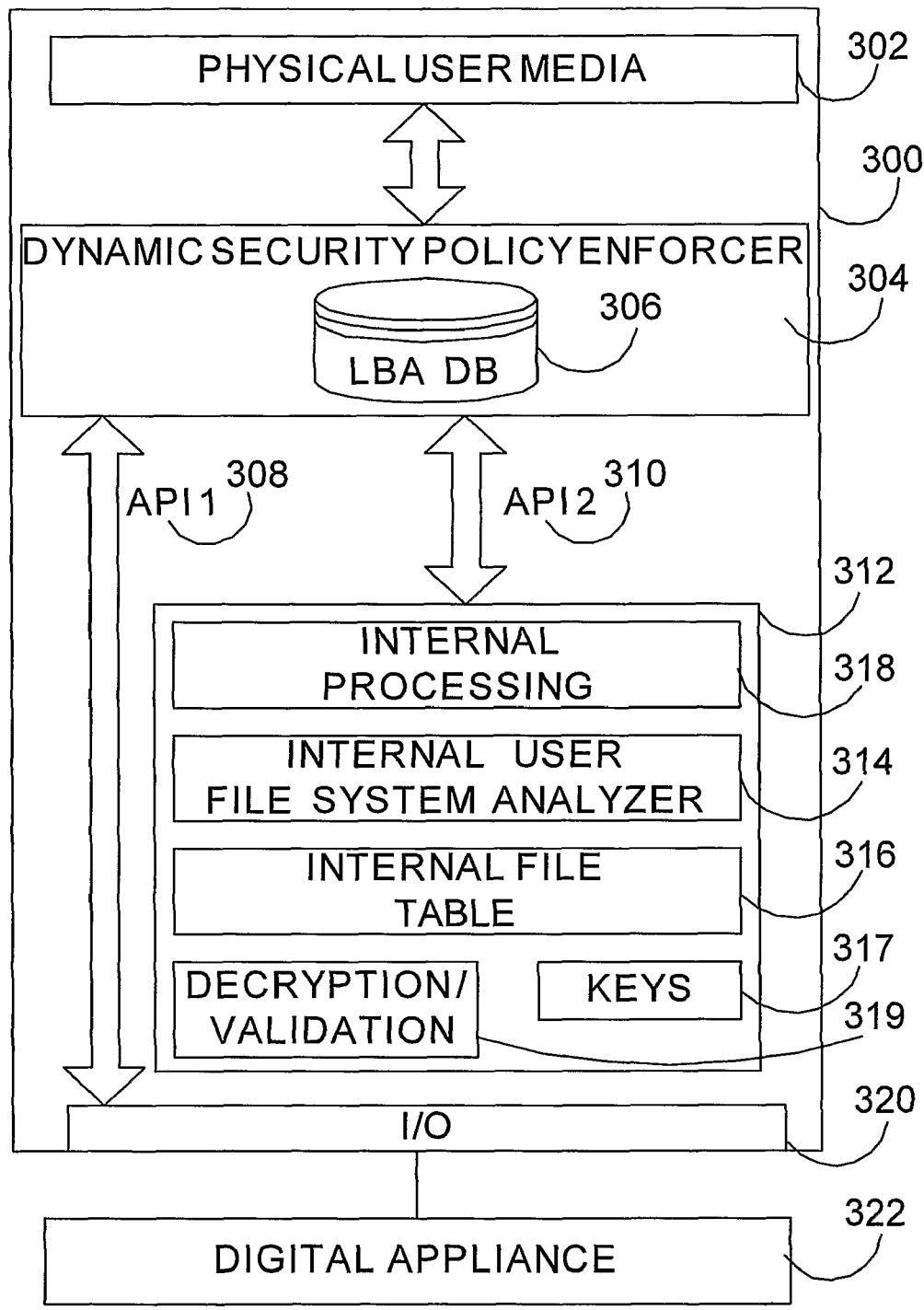
FIG. 3 is a block diagram illustration of a media device with a dynamic enforcement policy of an LBA Database implementation for two different API policies with an independent user file table, according to an embodiment of the present invention.

Reference is now made to FIG. 3 which is a block diagram illustration of a media device with a dynamic enforcement policy implementation and an LBA database, for two different API policies with an independent internal user file system, in accordance with an embodiment of the present invention. The device 300 is connected to a digital appliance 322. The media device 300 comprises physical user media 302, a dynamic security policy enforcer 304, which will be referred to herein as policy enforcer, an internal independent user file system and processing unit 312, and an I/O module 320. The policy enforcer 304 supports two different sets of API calls, API 1 308 and API 2 310. The policy enforcer 304 includes an LBA database 306. The internal independent user file system information and processing unit 312 comprises an internal processing module 318, an internal user file system analyzer 314 capable of receiving a file name from the external device and getting location information corresponding to the file name from a directory area in the memory, an internal file table 316, a decryption/validation module 319 and keys 317. The user physical media 302 is the media that may be accessed and used by the digital appliance 322. The media is accessed through LBA addressing. The policy enforcer 304 manages access to the user physical media 302 according to the LBA that is being accessed, the operation requested and the API that is being used for access. The LBA database 306 holds access policies for LBAs in the physical user media 302. These policies define, for each LBA, which API may access the LBA and what operation it may perform on the LBA. The internal independent user file system 312 includes restrictions as to how many times access will be granted, for how long, etc. The policy enforcer reads the access policy for a requested LBA and accordingly determines whether the API requesting access to the LBA is entitled to that access. If the answer is positive, access is granted, otherwise, access is denied. For example, the LBA database may include a policy for each of the LBAs in the physical user media 302, specifying which of the LBAs are accessible through a certain API. It is noted that the stored files are visible on the attached processing device as with any file management program. However when requests are made for a file that has a restriction, certain operations are not available or work differently. The restricted access API handles requests for the file, but makes file management operations available according to the corresponding LBA settings. Another example may be policies for LBAs which differ from a default policy. For example, a default policy may be that all restricted files may be read through all APIs except API1. A certain restricted file differs from the default policy and may be read only through API 2. The policy enforcement policies may be changed dynamically, during normal operation of the media device. This is done by allowing dynamic changes within the LBA database for each LBA in the physical user media 302, upon receipt of an appropriate API request. As previously mentioned, the fact that the policy enforcer 304 is internal to the media device 300 and inaccessible by the digital appliance 322 is a preventive measure against inappropriate access, as hackers may attempt to change security policies by accessing the policy enforcer itself. This hardware isolation of the policy enforcer, internal file table and processing unit from the digital appliance is therefore an effective preventive measure.

In the implementation shown, only two different policies are used. In other implementations more policies may be used for external or internal use. The internal independent user file system table 312 may contain information about the files stored in the physical user media, such as the order and location of sectors/clusters making up a file. This information may be gathered by the internal user file system analyzer 314 which accesses the user's file table and extracts user file information and location. This information may then be copied to the internal file table 316. In some embodiments the digital appliance 322 may extract user file table location information and pass it to the internal file table 316. In some embodiments the digital appliance 322 may extract the user file table location information and pass the information to the media device 300. In some embodiments the digital appliance 322 may extract the user file table location information and pass the information to the media device 300 in parts, which may be kept in volatile memory and/or in non-volatile memory, which may or may not be used immediately following transmission.

Note that the internal independent user file system 312 has independent access to each LBA of the physical user media 302 through API2 and with the help of the internal file table 316 can find the LBA locations of a file and make use of the data of that file. The digital appliance, on the other hand, has access to each LBA of the physical user media 302 only through a limiting API1, the limiting process being performed by the dynamic security policy enforcer 304, as previously explained.

Note that the internal processing module 318 may access various types of volatile and non-volatile memory such as RAM, ROM, FLASH, EPROM, Magnetic Disk etc, not included in the drawing for clarity.

With the addition of a Decryptor/Validation module 319 and Keys 317, a file may be transferred securely to the media device in an encrypted form. The file may then be decrypted and used internally, while its decrypted sectors are secured from access by the external device. A more detailed description of this process is provided in FIG. 6.

In embodiments where two policies exist within the LBA Database 306 each entry may, for example, be represented by one bit with unsecured policy as '0' and secured policy as '1'. If a single LBA data unit size is 512 bytes, then its database size of 1 bit is 1/4096 of a single LBA data unit. Thus storing access policies for each LBA within LBA Database 306 is very efficient in terms of use of available memory, both non-volatile and volatile and memory is usually a scarce commodity in small autonomous data storage devices. In some embodiments the LBA Database is physically stored on user media 302 while database sectors are protected from API1 access. In some embodiments the internal file table 316 may exist in the physical user media 302, protected from API1 access. This has the advantage of simplifying the hardware as only one memory unit is needed, but on the other hand, some of the user's memory space is used up.

The internal processing unit 318 may use the internal file table and other internal data, as well as data available through API2 in order to process and output files. Using the internal file table 316, the processed files may then be placed in the physical user media 302, accessible through API1 308, for the digital appliance 322 to use.

In some embodiments file permissions that are internal to the device may be kept within the internal file table. This can be done to conserve memory of the LBA database.

In some embodiments the internal independent user file system may access I/O unit 320 in order to output data directly to a digital appliance as well as receive certain specific commands from the user directly.

An example now follows for FAT32 formatted devices. Suppose file A.txt occupies sectors 3,4 and file B.txt occupies sectors 5,6 on user media 302, which is formatted to FAT32. Suppose that LBA Database 306 includes '0' (unsecured) for sector entries 3,4 and includes '1' (secured) for sector entries 5,6. Furthermore, the internal file table 316 includes an entry for file B.txt specifying that it is located in sectors 5, 6 and that it is in "usable" status. The user can read file A.txt, but when attempting to read file B.txt a file containing only zeros is received. This is because security enforcer 304 returns sectors of zeros upon requests to read protected sectors by unprivileged API1, while sectors 5 and 6 are protected. The user may change the media device FAT file table entry of file A.txt to be sectors 5,6 but that will not make sectors 5,6 readable as the sectors themselves are protected in the LBA DB 306 and not the file.

The internal processing module 318 may access file B.txt by looking up the sectors it contains through reading internal file table 316. Sectors 5,6 may then be processed since they are being read through API 2. Processed data may be output back to user media 302. In some embodiments data may be output directly to digital appliance 322 through I/O module 320. A user changing FAT table entry for file B.txt to include sectors 3,4 will not harm internal processing of file B.txt because the internal independent user file system 312 uses the internal file table 316 for file LBA reference. In this example we see that user media 302 serves as storage for protected file B.txt and unprotected file A.txt. Protected files location information is managed within the device, where the user has no access, and runs under a different processing unit than the digital appliance. Processing is done internally using protected file B.txt data and processed output is sent back to the user.

In the present example, the internal file table 316 and LBA database 306 initially receive information about file B.txt and its location sectors through internal file system analyzer 314, which finds location information of file B.txt from the user file table by analyzing the user file system table located on user media 302. The internal "usable" status of file B.txt is achieved following a validation procedure as described in FIG. 6 herein below.

In some embodiments cluster numbers may be used instead of LBA numbers.

Figure 4:
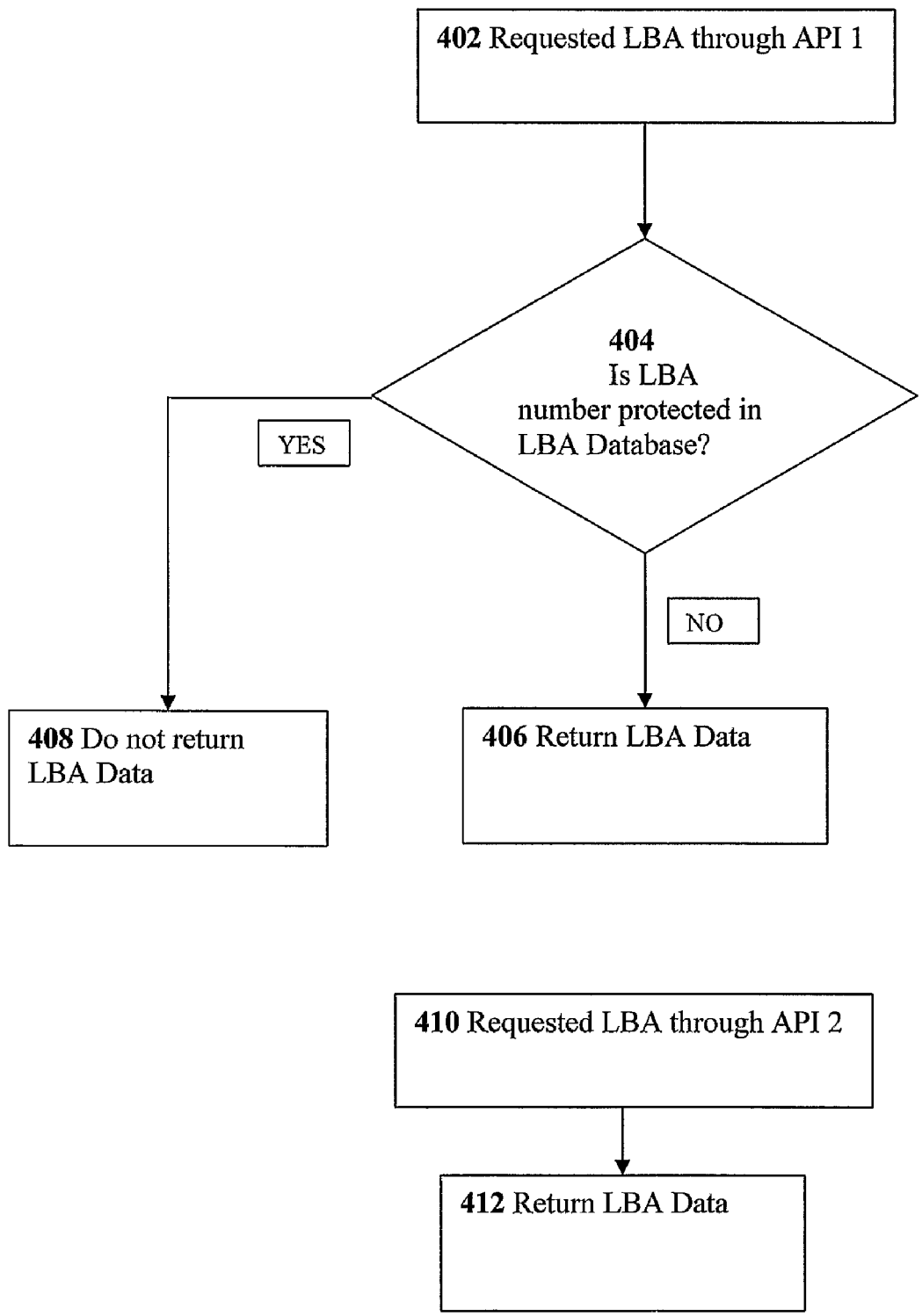
FIG. 4 is a schematic flowchart for reading LBA content through API 1 and API 2 with dynamic enforcement policy of an LBA Database implementation, according to an embodiment of the present invention.

Reference is now made to FIG. 4 which is a schematic flowchart for reading LBA content through API1 and API2 with a dynamic enforcement policy of an LBA database implementation, in accordance with an embodiment of the present invention.

In step 402 a request to read an LBA is made through API1.

In step 404 the policy enforcer 304 checks if the LBA requested is protected in the LBA database 306. If the requested LBA is not protected by the LBA database 306, the data at that particular LBA is returned in step 406. If the requested LBA is protected by the LBA Database 306, the data at that LBA is not returned in step 408. Alternatively sector data containing zeros may be returned.

In step 410 a request to read an LBA is made through API2. In step 412 the data of the LBA requested is returned. In this manner API2 allows access to protected LBA files that API1 does not allow, thus two different policies are enforced. Note that for a request to write to an LBA a similar approach may be made. A "write" command through API1 may be carried out only if the LBA is not protected in the LBA database. A write command may always be carried out through API2.

In the description below, the term "controller" refers to a controller within the media device, such as a CPU, and the term "Inode" refers to a data structure holding information about a file in a part of the memory that is inaccessible from outside the media device, as part of the internal file table 316.

Figure 5:
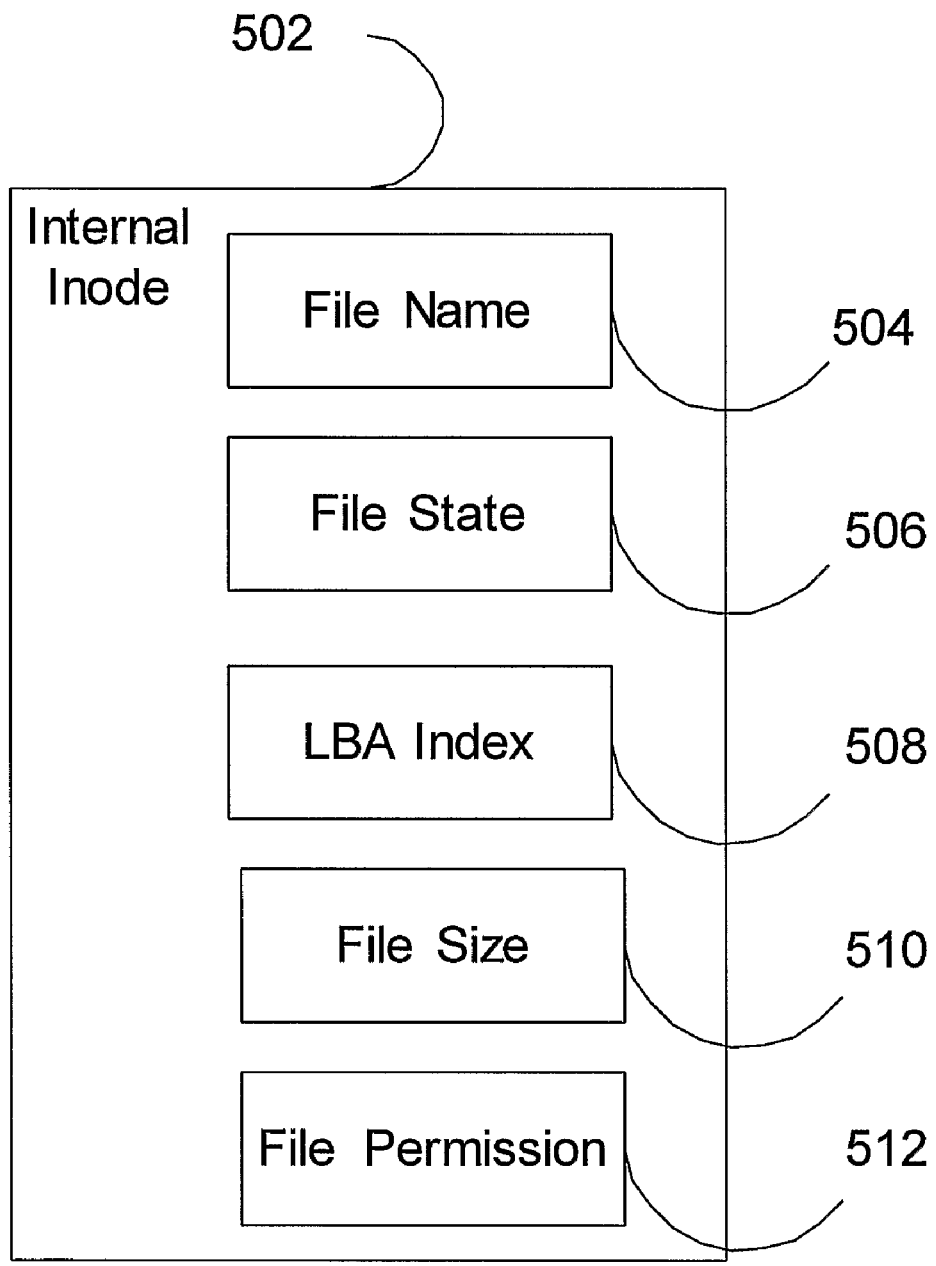
FIG. 5 is a block diagram illustration of an internal Inode in an internal file table of the non-volatile media of a media device, according to an embodiment of the present invention.

Reference is now made to FIG. 5 which is a block diagram illustration of an internal Inode in an internal file table of the non-volatile memory of a media device, in accordance with an embodiment of the present invention. The internal Inode 502 comprises the following fields: file Name 504, file State 506, LBA Index 508, file Size 510, file Permission 512. The File State field indicates the state of the file, for example "pending" or "usable". LBA Index indicates the LBA addresses occupied by the file. File permission defines the access policy for that file.

The internal Inode keeps all file information necessary in order to allow access to files in the user physical media 302, thus assuring independence of the FAT (file allocation table), a table which is susceptible to user changes. The internal file system keeps records of the file name 504 of the enforced policy file, the state of the file 506 (whether the file is available for use), the LBA index 508 of the LBAs making up the file, the file size 510 of the file and the file permission 512 for the permission policy to be enforced. This information is kept internally and is unalterable by the user.

In some embodiments, the internal mode keeps usage rules for each secure file. Such rules may include expiration time of allowed usage.

In some embodiments, the internal mode keeps track of current usage information for each secure file. Such information may include number of times usage has been made, total time duration a file has been used etc.

In some embodiments file permission 512 holds internal file access permissions to restrict file access requests for different APIs accessing the limited access files internally to the device. In this case the LBA database may hold information regarding external APIs only, for read and/or write permissions.

Figure 6:
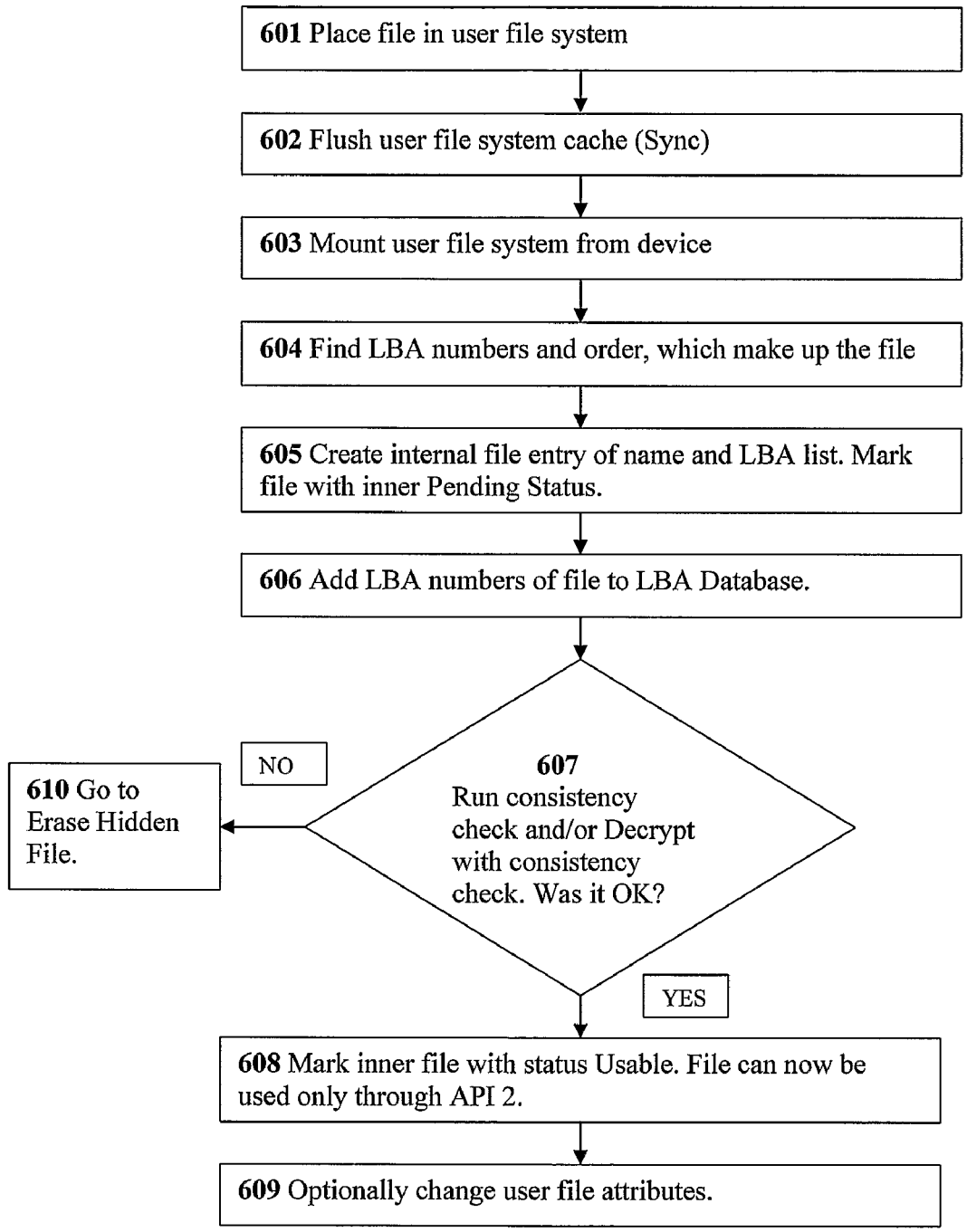
FIG. 6 is a schematic flowchart for dynamically securing a file on the media device, according to an embodiment of the present invention.

Reference is now made to FIG. 6, a schematic flowchart for securing a file dynamically, in accordance with an embodiment of the present invention.

In the description herein, the term "cluster" refers to a basic allocation unit used by a file system. A cluster size may be one or more sectors of, and the sectors in a cluster are continuous. A translation from a cluster number to an LBA is made with the sectors contained within a cluster as well as independent file system information.

In step 601 the file to be protected is placed in the media device, in the user media, for example by copying the file into the media device or transferring it from the internet onto the media device.

In step 602 the digital appliance cache and buffers are flushed. This is done for example in Linux by the utility Sync. In Windows this is done for example by a utility called Sync from www.sysinternals.com.

In step 603 the file system of the user is mounted from within the device with the internal user file system analyzer 314. The physical user media 302 now includes the recently transferred file, now that the digital appliance has flushed its buffers.

In step 604 the LBA indexes making up the file are collected from the file system table. For example in a FAT32 file system the file's first cluster is indicated in the file's directory entry. The second cluster entry is included in the FAT entry for the first cluster. The third cluster is included in the FAT entry of the second cluster and so forth. The LBA order of indexes is translated from the cluster numbers above.

In step 605 an internal file entry including name and LBA list is created in the internal file table 316. The file entry is created in a location inaccessible by the digital appliance, so as to prevent accidental or illegal changes by the digital appliance. The internal file entry may be included within one or more internal Inodes 502. More than one Inode per file may be required if the file is not saved in continuous LBAs, or if the file is particularly large. The information stored may include the file name, the LBA list and order of where the file data is stored on the user physical media 302. The file status in the internal Inode is marked as "pending" and cannot be used internally by the device at this time. In step 606 the LBA indexes making up the file are added to the LBA Database. As a result (see FIG. 4) these LBAs become inaccessible through API1 308, and the file effectively becomes a restricted access file. As API2 310 is not accessible through the digital appliance, these LBAs become inaccessible by the digital appliance. In step 607 the internal processing unit 318 makes a consistency check and/or decryption of the file. This may be done through the Validation/Decryption module 319, possibly using an internal key from Keys 317 and/or other means of checking/confirming file validity such as by using digital signatures, for example SHA-1, MD5 and/or others by retrieving a signature to check origin and integrity of data received. This is done to check if the file is consistent, since at this point the digital appliance (or user) is unable to alter the file or the internal file information. In some embodiments where the file is an encrypted file, the file is now decrypted using keys that are inaccessible by the digital appliance and that may be hidden from other parts of the media device as well. Some of these keys may be located internally in the device and/or included in another encrypted file. Some of these keys may be located in an internal decrypting chip for example. Symmetric algorithms such as DES, AES and/or asymmetric algorithms such as RSA, Diffie-Hellman and/or other types may be used for decryption. In some embodiments another file called a certificate file assists in the decryption process, as described in FIG. 10. If the file is decrypted and/or validated successfully step 608 follows. If the file decryption and/or validation process is unsuccessful, step 610 follows. In step 608 the inner file is marked with status "usable". This means that the file is consistent and can be used with API2 310, but the file is inaccessible to users using API1 308, in this case through the digital appliance.

In step 609 the file attributes are optionally changed in the user accessible file table. This may be done to prevent the user from using or modifying the secure file. File attributes may be changed to "System", "Hidden", "Read-Only" and so forth so that the file will not be accidentally removed by the user or a de-fragmentation operation will not attempt to change the physical location of this file. Marking file sectors (or clusters) as "bad" so that the digital appliance will not use them is another possibility, as computers do not use clusters marked as "bad", and de-fragmentation programs do not attempt to move "bad" clusters. In step 610, following an unsuccessful consistency check in step 607, the hidden file is erased. See FIG. 7 for details. In some embodiments step 607 (consistency checks) may be repeated a number of times before a decision to erase the file is made. In some embodiments the erasing process may not occur at this time. This series of steps illustrates how a file may change its security policy dynamically with the LBA dynamic security enforcer 304. This dynamic change is made possible with the use of the LBA database 306 and the internal file table 316. The internal file table 316 gathers independent "meta-data" file information for the dynamic security policy enforcer 304. This information allows changing the LBA access to the LBA indexes making up the file, through the use of the LBA database 306. Even if a user attempts to change the file allocation table of the file system, the file will remain inaccessible due to the fact that the file meta-data is managed through the internal file table 316, which is inaccessible to the user. The LBA database protects the correct LBA indexes as listed in the internal file table 316. These series of steps are preferably made in the above order so that stopping in the middle of any of the steps does not allow protected data security to be compromised by an unauthorized user. In addition, stopping in the middle of any of these steps does not allow internal usage of data that is not validated, as such data may compromise security.

In some embodiments the content is encrypted twice. First, a file may be encrypted in portions specifically as used by content (i.e. mp3 frames, complete picture images etc.) Then, the entire file may be entirely encrypted. In FIG. 6 the decryption algorithm may decrypt the entire encryption in place, so that each encrypted sector becomes an unencrypted sector, and leave the secondary encryption in place, for added security. Upon internal usage, relevant content is decrypted for usage but kept encrypted in non-volatile memory for added protection.

Figure 7:
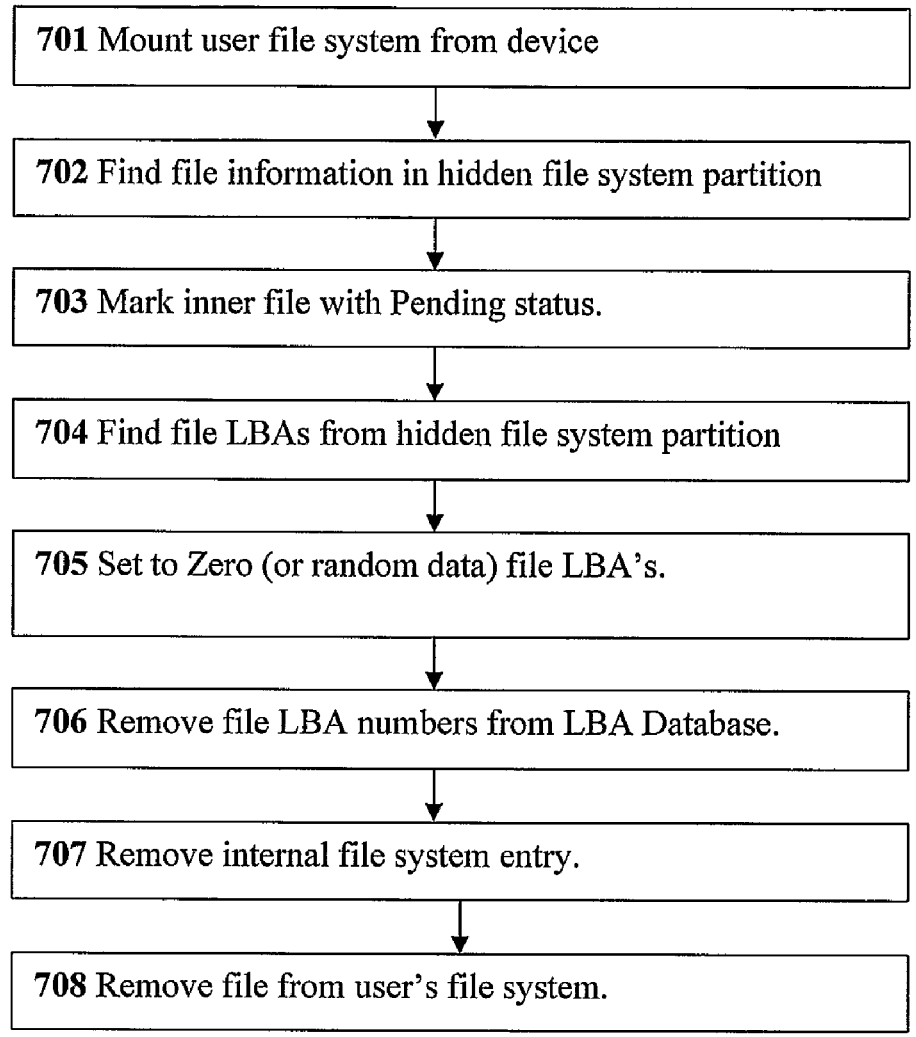
FIG. 7 is a schematic flowchart for the dynamic removal of a secure file from the media device, according to an embodiment of the present invention.

Reference is now made to FIG. 7 which is a schematic flowchart for the dynamic removal of a secure file from the media device, in accordance with an embodiment of the present invention. In step 701 the file system of the user is mounted from within the device. This step may be followed by a flushing of the user file system. (see step 602). In step 702 requested file information located within the internal file table 316 and hidden from the digital appliance 322 is located for use. In step 703 the secure file is marked with a status "Pending" in the internal file table 316. This means that the file may not be used at this stage. In step 704 the LBA indexes making up the file, kept internally in the internal file table 316, are located for the next steps. In step 705 the content of the LBA indexes located in step 704 are set to zero or some other value which may be constant or random. This data is effectively erased, and a recovery of the data is not possible at this stage. In step 706 the LBA indexes that were located in step 704 are removed from the LBA Database 306. As a result, according to FIG. 4, these LBA become accessible through API1 308, as they no longer belong to a restricted access file.

In step 707 the internal file table 316 entries of the file being removed are removed from the internal file table 316. In step 708 the file is removed from the user's file system. This is possible since the file is now a normal readable file and not a restricted access file, and hence it can be accessed by the user through API1. This completes the transfer of file permission from secure to non-secure in a dynamic manner, and the erasing of a secure file. This is done in conjunction with the LBA dynamic security policy enforcer 304. These series of steps are preferably made in the above order so that stopping in the middle of any of the steps does not allow protected data security to be compromised by an unauthorized user. In addition, stopping in the middle of any of these steps does not allow internal usage of data that is not validated, as such data may compromise security.

Figure 8:
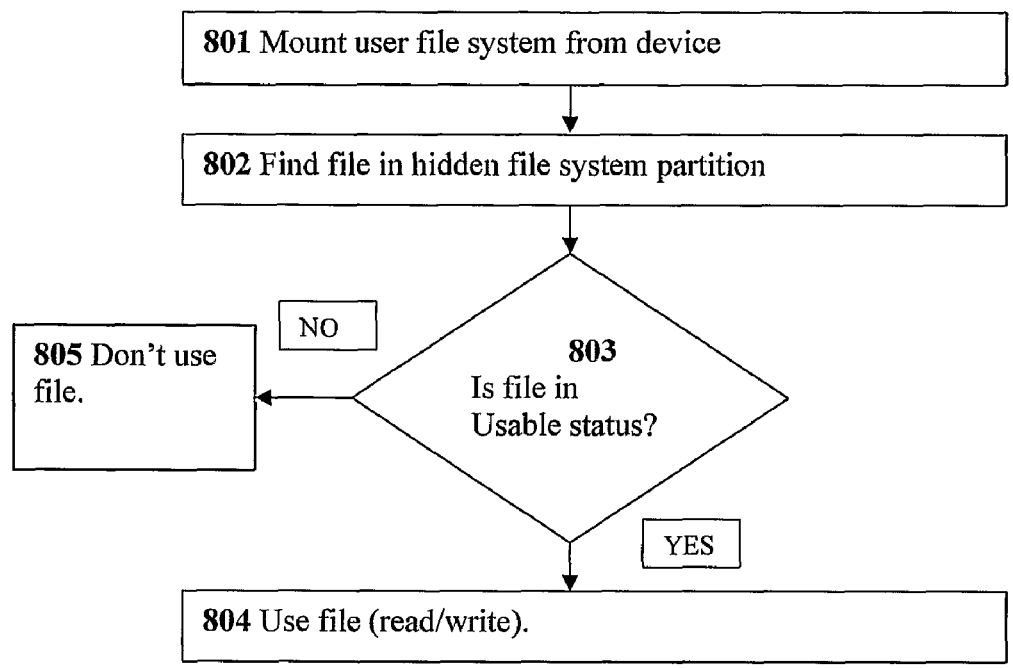
FIG. 8 is a schematic flowchart for using a secure file, according to an embodiment of the present invention.

Reference is now made to FIG. 8 which is a schematic flowchart for using a secure file, in accordance with an embodiment of the present invention. This flowchart displays how API2 is used. In step 801 the file system of the user is mounted from within the device. This step may be followed by a flushing of the user file system cache. (see step 602). In step 802 the file information in the internal file table 316 is located. This information is internal to the media device 300. In step 803 a check is made of the status of the file as indicated in the internal file table 316. If the file is in a usable status then step 804 follows, and the file may be used. If the file is not in a usable status but for example it is in a "pending" status, step 805 follows and the file may not be used. In step 804 file usage may be permitted, for example to read the LBA data and to internally process the file data. In step 805 permission is not granted and access is denied. This sequence of steps illustrates how the internal file table 316 assists with the security policy process of the files and how a protected file may be used internally. The sequence also illustrates how security is not compromised during the transition period of a file from a non-secure file to a secure file. By first checking the internal status of a file we are assured all steps to secure the file have been carried out and that file removal has not been initiated. The file status defines the integrity of the file, and whether it may be accessed at this stage.

In the description herein, the term "certificate" refers to a data file that includes information about content. Such information may be the name of related content, expiration time of content, decryption key for content etc.

Figure 9:
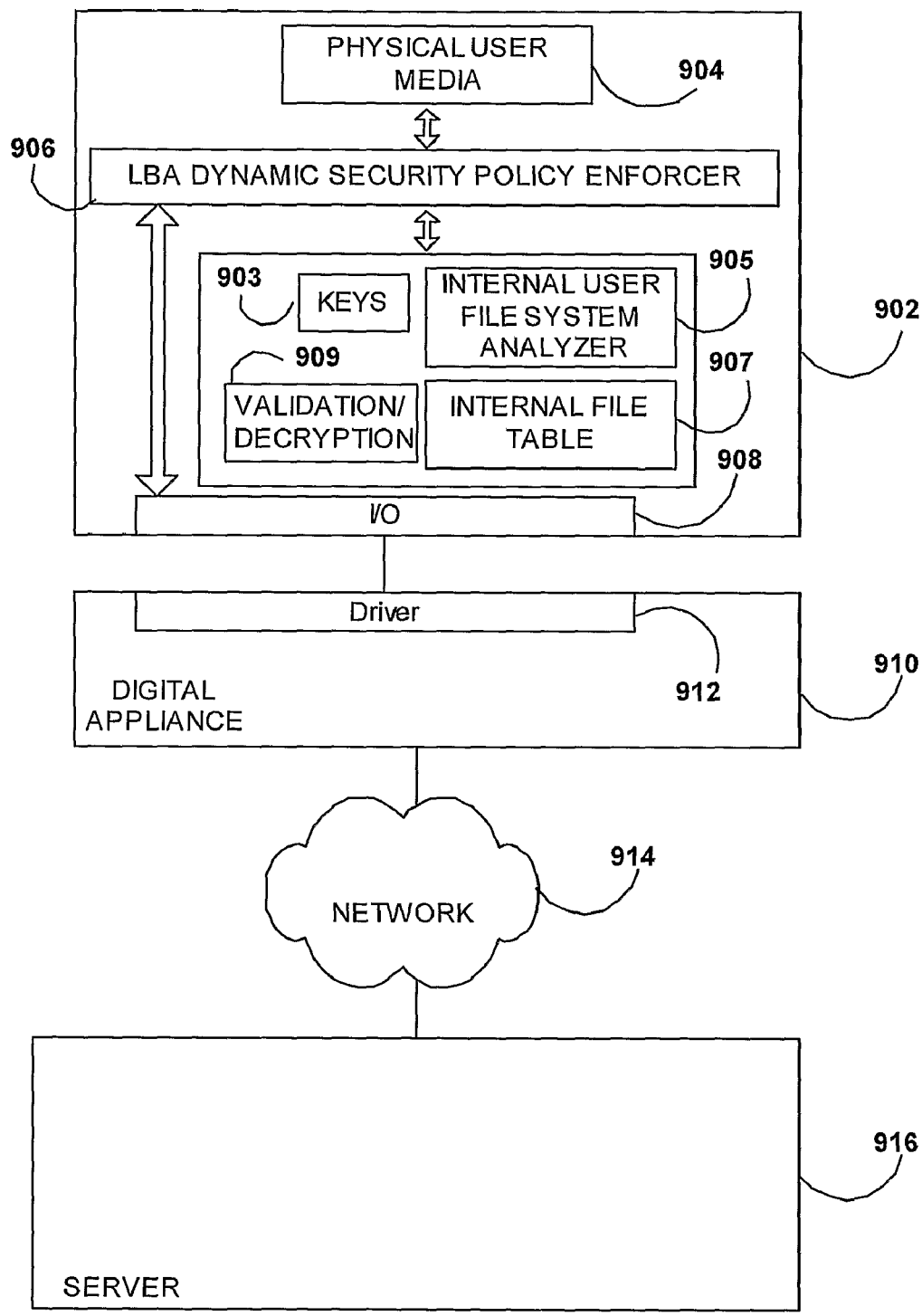
FIG. 9 is a block diagram illustration of a media device connected to a networked server through a digital device.

Reference is now made to FIG. 9 which is a block diagram illustration of a system in accordance with an embodiment of the present invention. A media device 902 is connected to a digital appliance 910, and the digital appliance 910 is connected to a server 916 through the network 914. The media device 902 comprises a physical user media 904, an LBA dynamic security policy enforcer 906, an internal user file system 905, an internal file table 907, a validation/decryption unit 909, keys 903 and an I/O module 908. The media device 902 is similar to the media device described in FIG. 3. In other embodiments media device 902 may be similar to those described with respect to FIG. 2, FIG. 12 etc. The digital appliance 910 includes a driver 912 to communicate with the media device 902. The user physical media 904 refers to the memory that is accessed and used by the digital appliance 910. The policy enforcer 906 manages access to the physical user media 904 depending upon the LBA that is being accessed and its access policy, and the API that is being used for the access. See FIG. 2 for more information about the dynamic policy enforcement of the policy enforcer 906. The validation/decryption unit 909 allows data validation and/or decryption possibly with an internal decryption key 903, for the purpose of authorizing data from the network. As mentioned earlier, encrypted files have to be validated before they are stored in the media device. The digital appliance 910 is connected to a server 916 through the Network 914. The system in this figure allows downloading content from a server 916 into a media device 902 in a such a way that the content is managed according to the security policy defined for the file by the server and in accordance with the security policies supported by the media device. The security policy may be implemented in a separate certificate sent from server 916 for sent content. Certificates may include a decryption key for content, and parameters specifying the allowed usage for the content, for example time expiration. A method of sending such files is displayed later in FIG. 10. The internal processing unit of the media device 902 may use the internal file table 907 and other internal data in conjunction with data available in order to process and output data. The processed output data may be placed in a file in the physical user media 904 using the internal file table 907, for the digital appliance 910 to use, or may be output directly through the I/O module (not shown).

Figure 10:
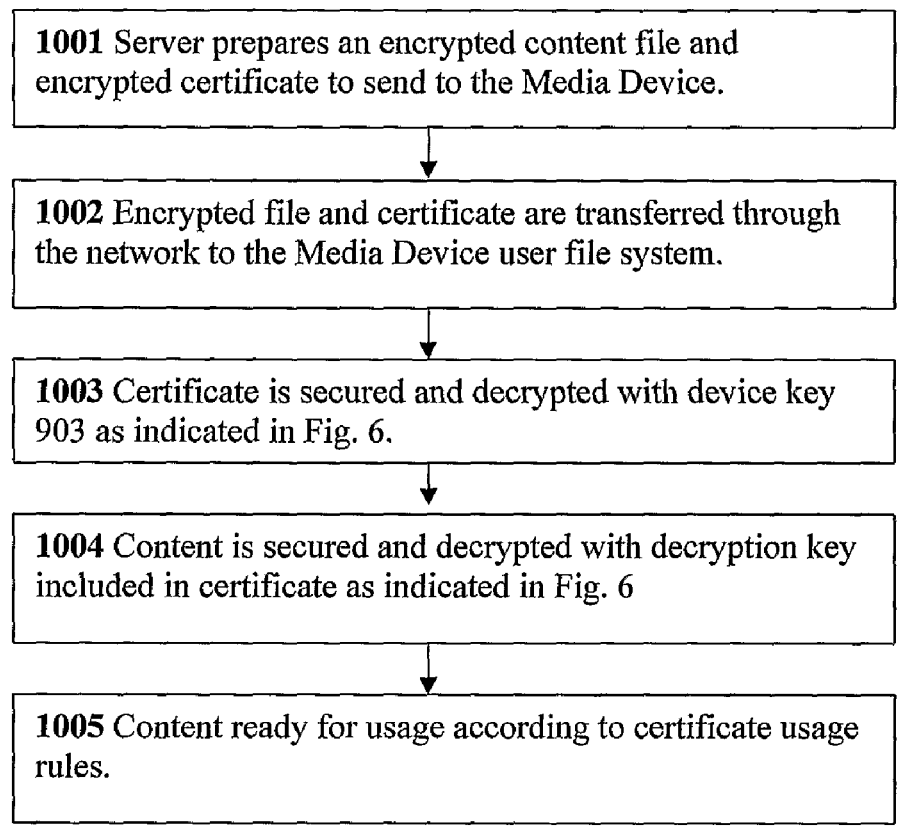
FIG. 10 is a schematic flowchart illustrating a secure file transfer from a networked server to a media device, according to an embodiment of the present invention.

Reference is now made to FIG. 10 which is a schematic flowchart illustrating the use of the system of FIG. 9 to transfer and store secured data from a server to a media device, in accordance with an embodiment of the present invention.

In step 1001 the server 916 prepares an encrypted content file and an encrypted certificate to send to the media device 902. This step can be initiated by a request from the digital appliance 910, from the server 916, or from another entity such as a push server. A certificate is a file containing a decryption key for an encrypted content file and a file access policy for the content file. A certificate file may contain other data or more data. In some embodiments the file content may already be encrypted, and so the server may not have to encrypt it. The server then encrypts the certificate with the device key. In some embodiments an encrypted content file may be transferred to the digital appliance by means of a portable media such as a CD-ROM or DVD-ROM or similar means. In step 1002 the encrypted file and certificate are transferred through the network 914 to the media device user file system. The files are still encrypted and are normal files on the user's device. In some embodiments only a portion of the file may be copied, for example in an embodiment where the media is a transportable media as mentioned above. In step 1003 the encrypted certificate access policy is changed dynamically to secure, and decrypt with the device key, as described in FIG. 6. This may be done through the use of the LBA dynamic security policy enforcer 906, the internal user file system 905, the internal file table 907 and validation/decryption unit 909 using decryption keys 903. In step 1004 the encrypted content access policy is changed dynamically to secure, and decrypt with the certificate key, as described in FIG. 6. In step 1005 the file can now be used according to its security policy and certificate rules. With the example of API 1 and API 2 of FIG. 3, this means that the file is readable through API 2 and not through API 1. In other embodiments where other APIs exist, such as in FIG. 2, the content file may be used only by entities that are allowed access by the policy enforcer. These entities are allowed access according to file access policy as indicated in the certificate file.

An example for usage of a plurality of policies now follows. Suppose company A has program Pa installed in the media device and company B has program Pb installed in the media device. The user requests to download data file Da for use with program Pa. The user then requests to download data file Db for use with program Pb. Data file Da is encrypted and downloaded with encrypted certificate Cda with permission Qa for use with program Pa as explained in FIG. 10. Data file Db is encrypted and downloaded with encrypted certificate Cdb with permission Qb for use with program Pb as explained in FIG. 10. Following the steps described in FIG. 10, both data files Da and Db are decrypted, inaccessible outside the device and ready to be used according to their access policies. Program Pa can access data file Da using permission Qa and program Pb can access data file Db using permission Qb. If however program Pa attempts to access file Db, access will be denied. This is because the access policy of program Pa is Qa which is restricted to data file Db with access policy Qb. Access will be denied as well if program Pb with access policy Qb attempts to access data file Da with access policy Qa. In this manner it is possible to transmit files securely for use within the device and only for a specific program within the device. This ability allows a multiple permission environment within the device and enhances security for multiple entities that can use the same device.

In another embodiment a certificate also contains a digital signature for the content file. This digital signature may be used in the validation process of FIG. 6 in step 607.

In the description herein below, the term "Decryptor" refers to a unit capable of decryption of data with appropriate keys. This decryptor may implement one or a plurality of methods such as DES, AES, RSA, Diffie-Hellman and/or others.

Figure 11:
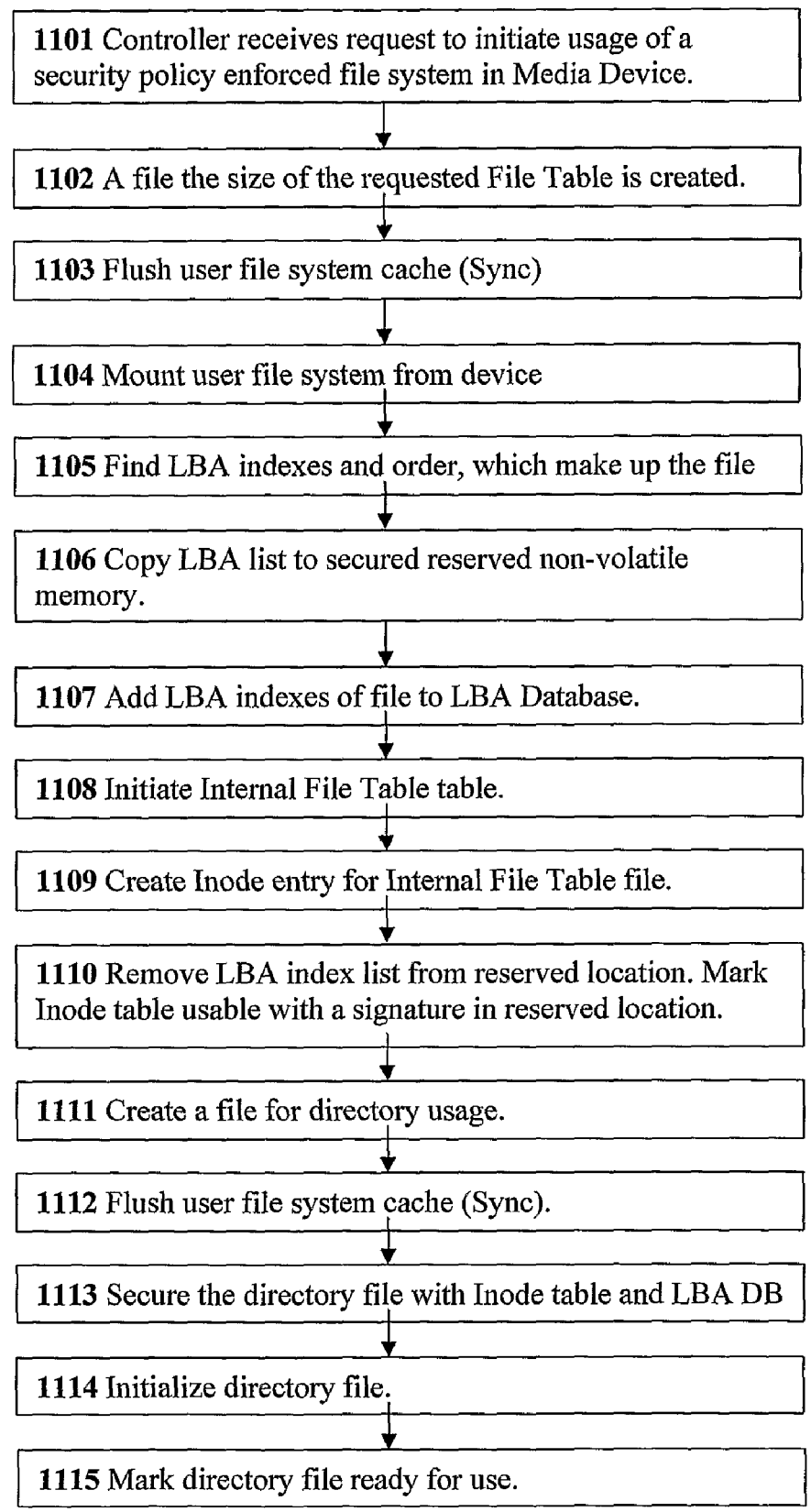
FIG. 11 is a schematic flowchart for dynamically creating an internal file table within a physical media, according to an embodiment of the present invention.

Reference is now made to FIG. 11, a schematic flowchart for dynamically creating an internal file table within a physical user media, in accordance with an embodiment of the present invention. In this series of steps it is shown that the internal file table 316 does not need to exist initially in media device and may be created dynamically in user media 302 upon request.

In step 1101 the media device receives a request to initiate usage of a security policy enforced file system for the media device. In step 1102 the size for the required internal file table is calculated and a file that size is created. Note that this file is a normal user file at this time. We will refer to this file as the internal file table file. In step 1103 the digital appliance cache and buffers are flushed as in step 602. In step 1104 the file system of the user is mounted from within the device. This is possible now that the digital appliance has flushed its buffers. In step 1105 the LBA indexes making up the internal file table, prepared in step 1102, are collected from the file system table. In step 1106 the LBA index list of step 1105 is copied to a secured reserved location in the policy enforcer non-volatile memory. Note that this size may be as small as one sector. This copying process is referred to as file table bootstrapping, and is explained below. For now we will assume the entire list has been copied to the policy enforcer's non-volatile memory. This step is similar to step 605 but without the internal file table's assistance of storing data.

In step 1107 the LBA indexes stored in step 1106 are added to the LBA Database as in step 606. As a result, the LBA data of these indexes become inaccessible from the digital appliance through API 1. In step 1108 the internal file table is formed and initialized. If necessary its content is zeroed before this step occurs. The file is marked usable as in step 608. The file attributes may be changed as in step 609. In step 1109 an internal file entry including an LBA index list is created for the internal file table file. The list is copied from the reserved location for initial LBA indexes of step 1106. In step 1110 the LBA index list of step 1106 is removed from the reserved location. The reserved location is marked to indicate that the internal file table is usable. From this point on, the mark at this location may be checked prior to any reference to the internal file table. In step 1111 a user internal directory file is created. In step 1112 the digital appliance cache and buffers are flushed as in step 602. In step 1113 the directory file is secured with the internal file table and the LBA database similar to step 604. An internal file table entry is created similar to step 605, with a new file name. LBA indexes are then added to the LBA database as in step 606. In step 1114 the directory file is initiated for use, and in step 1115 the file is marked with status "usable" as in step 608. File attributes may later be changed as in step 609. This sequence of steps illustrates how the internal file table may be created dynamically within the physical user media. This ability is useful for the flexibility of the media device, enabling it to be used solely for the purpose of storing the user's files, as well as the ability to become a security enforced media device. The significance here is that the media device may initially be competing with other media devices offering a similar size of user memory. The media device does not need to allocate memory space for the internal file table when initially given to an end user.

An explanation of the file table bootstrapping now follows: In step 1106 of FIG. 11, the LBA index list of the internal file table is copied to a secured reserved non-volatile memory portion within policy enforcer's non-volatile memory. The size of this reserved space is not large, but it may be preferable to limit it to be as small as one sector. This sector will be referred to herein as the bootstrapping sector. Limiting the reserved space is possible through the process that will be referred to as file table bootstrapping. In this process the LBA indexes making up the internal file table collected in step 1105 are copied into the bootstrapping sector until the bootstrapping sector is full. The LBA indexes in the bootstrapping sector are then added to the LBA database as in step 1107. The content of the LBA indexes are initiated for that portion of LBAs as in step 1108. An internal file entry (or inode) including the LBA indexes portion is created similar to step 1109. The bootstrapping sector is then cleared and the additional LBA indexes making up the internal file table (as collected in step 1105) are copied into the bootstrapping sector, until that sector is full again. This process continues until all LBA indexes are contained in the internal file table. Step 1110 then follows by placing a mark in the bootstrapping sector, marking the completion of the file table bootstrapping process. The file table bootstrapping process may also be performed using a memory size smaller than one sector, or by the use of volatile memory and/or non-volatile memory for placing the mark mentioned above, indicating the completion of the process.

In some embodiments the memory of the dynamic security policy enforcer 304 may be initialized and activated dynamically, as with the internal file table of FIG. 11, thereby allowing more user memory to be initially free for user purposes. This may be done for example, by reserving a small number of sectors for the policy enforcer and then dynamically expanding it to its full size. The initial policy enforcer only lists the number of sectors that are secured.

Figure 12:
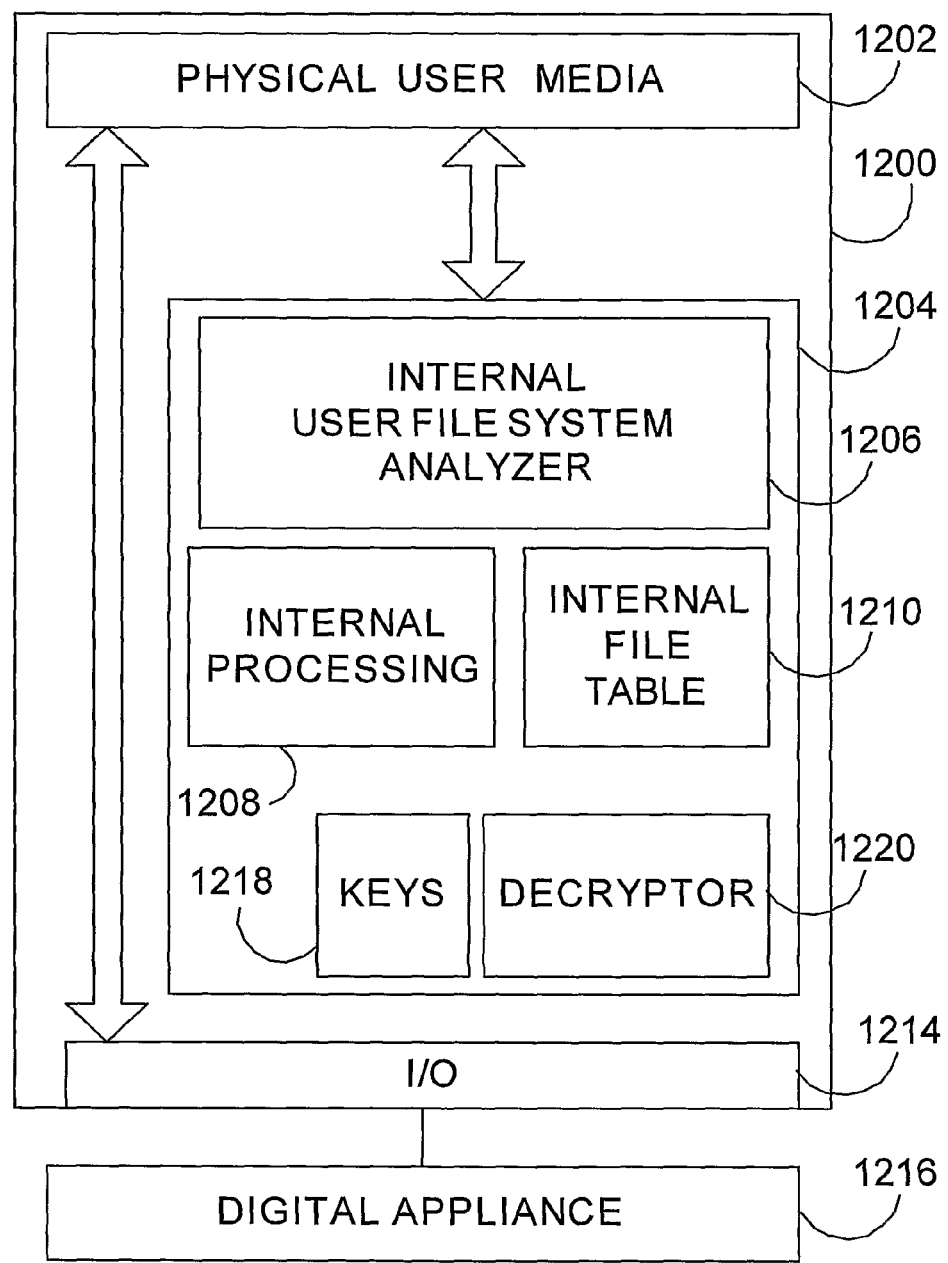
FIG. 12 is a block diagram illustration of a media device with an internal decryptor and an internal independent user file system table connected to a digital appliance, according to an embodiment of the present invention.

Reference is now made to FIG. 12 which is a block diagram illustration of a media device with an internal decryptor and an internal independent user file system table connected to a digital appliance, in accordance with an embodiment of the present invention. The media device comprises a physical user media 1202 and an internal file management system and policy enforcer 1204. The internal file management system and policy enforcer 1204 comprises an internal processor 1208, a decryptor 1220, keys 1218, an internal user file system analyzer 1206, and an internal file table 1210. The internal user file system analyzer 1206 is capable of receiving a file name from the external device and getting location information corresponding to the file name from a directory area in the memory and storing it in the internal file table 1210. I/O Module 1214 responds to sector level commands from digital appliance 1216 for sector data in user media 1202. Other volatile or non-volatile memory may exist but are not included in the drawing for clarity. The volatile memory may include one or more RAM types, while the non-volatile memory may include ROM as well as media such as flash memory, magnetic disk media and/or other non-volatile media. In some embodiments the internal file table 1210 and/or Keys 1218 may be included in the physical user media as an encrypted file protected from the digital appliance, or in various other places within other protected memory portions of the device. In some embodiments the Keys 1218 may be kept within a separate decrypting chip. For added security, the policy enforcer 1204 is unreachable outside the media device. The Keys 1218 may be different for every device and be separate for each secured file. For example, keys may be kept within each content certificate, where content certificate is encrypted with a device key. The internal file management system and policy enforcer 1204 includes an internal processor 1208, which in conjunction with the decryptor 1220 and keys 1218, may decrypt content and use it internally by reading encrypted content from user media 1202. Content is decrypted in conjunction with the file table, which tells the location of the encrypted content file in the user media 1202. Content may be processed or directly sent out to user media 1202. In some embodiments content may be sent back directly to I/O module 1214, Secured content data read by digital appliance 1216 through I/O module 1214 is encrypted and unusable. In some embodiments internal file table 1210 includes internal policy rules for each file included in internal file table. Such rules may include an expiration time of allowed usage, a number of times usage is allowed etc.

The dynamic property of the policy enforcer 1204 is implemented in such a way that any additional encrypted files may be decrypted and used internally.

Figure 13:
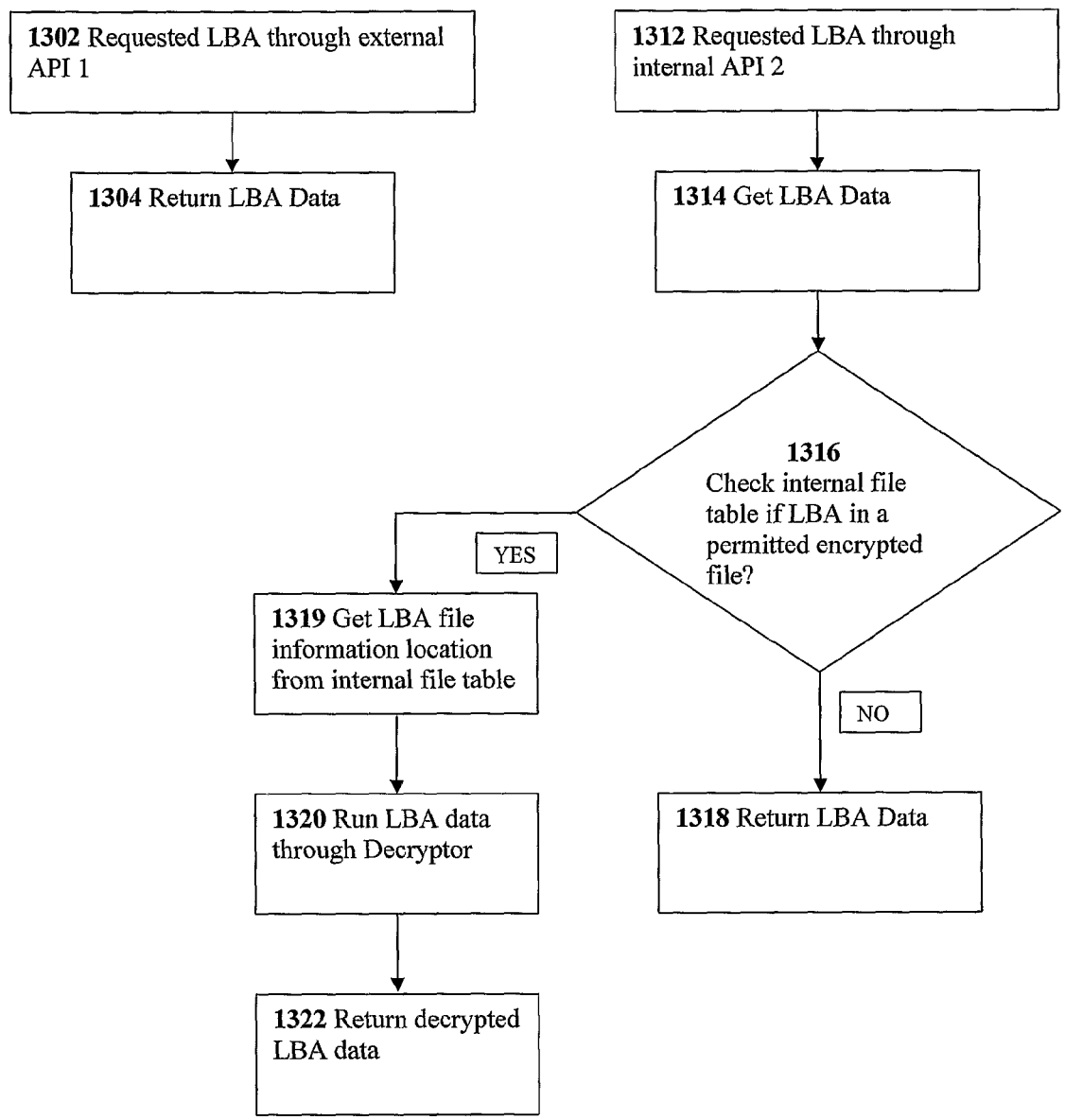
FIG. 13 is a schematic flowchart illustrating the reading LBA content through API 1 and API 2 with dynamic enforcement policy of an LBA decryptor in accordance with an embodiment of the present invention.

Reference is now made to FIG. 13 which is a schematic flowchart for reading LBA content through API 1 and API 2 with dynamic enforcement policy of an LBA decryptor in accordance with an embodiment of the present invention. Encrypted files are requested through both external API1 and internal API2. Requests through API1 receive encrypted files, while file requests through API2 receive decrypted files.

In step 1302 a request to read an LBA is made through external API 1.

In step 1304 the LBA data content requested (file) is returned. In this manner API 1 protects data of protected LBA data, due to the fact that the LBA data contents is still encrypted. In FIG. 13 the internal file management system and policy enforcer 1204 contains the statuses for several different files which are currently open and have been initialized for decryption or have been partially decrypted. The initialization of file decryption makes use of one or more key located in keys 1210.

In step 1312 a request to read an LBA is made through internal API 2.

In step 1314 LBA data is collected.

In step 1316 the internal management system and policy enforcer 1204 checks if the LBA requested is included in an internally known encrypted file. The internal file table 1208 is used for this check. If the requested LBA is not in an encrypted file, the LBA data content is returned in step 1318. If the requested LBA is included in an encrypted file, then step 1319 follows. In step 1319 LBA file location information is received from internal file table 1210. In step 1320 LBA data is decrypted through the decryptor. In step 1322 the decrypted LBA data is returned.

In some embodiments in step 1316 internal file management system and policy enforcer 1204 checks if the LBA requested is in an internally known, valid encrypted file and that file is permitted for use according to internal policy rules. Policy rules may be stored in an internal file table for each file. Such rules may include expiration time of allowed usage, number of times usage is allowed etc.

Figure 14:
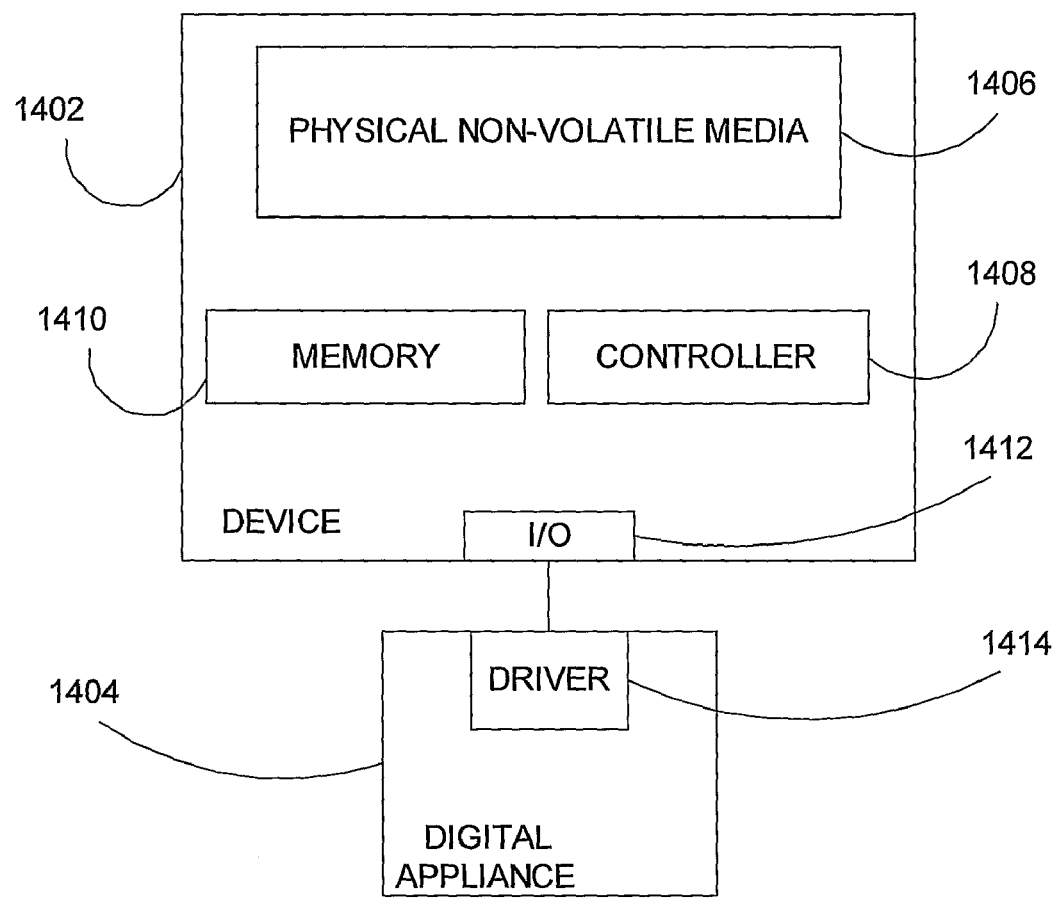
FIG. 14 is a block diagram illustration of a media device connected to a digital appliance, according to an embodiment of the present invention.

Reference is now made to FIG. 14 which is a block diagram illustration of a media device connected to a digital appliance, in accordance with an embodiment of the present invention. A media device 1402 is connected to a digital appliance 1404. The media device 1402 comprises a physical non-volatile media 1406, a controller 1408, memory 1410 and an I/O interface 1412. The digital appliance 1404 includes a driver 1414. The block diagram of FIG. 14 illustrates the parts comprising the media device 1402, showing that the media device has computational capability of its own, enabling the enforcing of security policies as well as carrying out computations internal to the media device. The controller 1408 is in the media device and is capable of using internally available security policies. As a result of its computational abilities and internal policies, the controller 1408 can generate files with or without permission for the digital appliance to read. The physical non-volatile media 1406 includes the user visible physical media 1406 as well as media used only internally in the device, are shown in more detail in FIG. 15.

Figure 15:
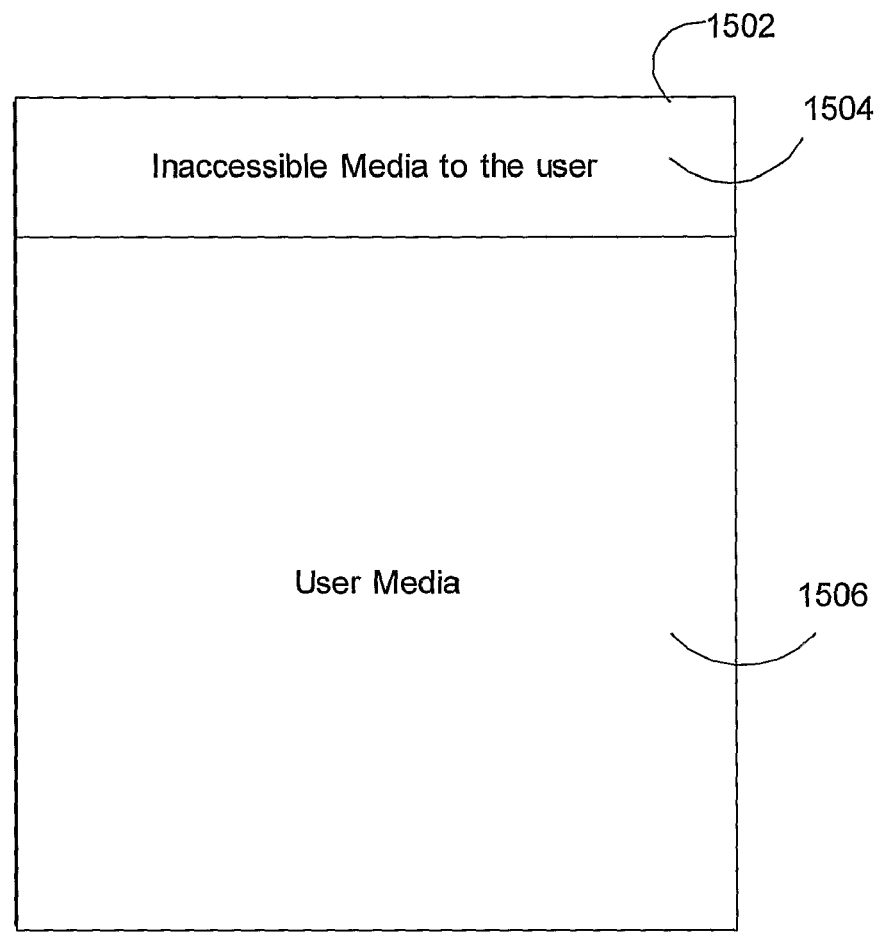
FIG. 15 is a block diagram illustration of the non-volatile media of a media device, according to an embodiment of the present invention.

Reference is now made to FIG. 15 which is a block diagram illustration of the non-volatile media of a media device, in accordance with an embodiment of the present invention. A media device 1502 comprises memory inaccessible to the user 1504 and user accessible memory 1506. The inaccessible media is available internally to the media device and not to the digital appliance.

It may be appreciated by those skilled in the art of the present embodiments that the present embodiments have the following advantages over existing art:

With the present embodiments, it is possible to use a single, standard file system of a media device to support the enforcement of several user policies in addition to using the media device for common file system usage.

The present embodiments allow the changing of user policy for each part of the file system, in a dynamic manner. The entire user file system may be used for the purpose of user files as well as secured policy-enforced files. Parts of the internal management of the policy enforcement may be created in the user file system area, allowing to maximize initial user memory space.

In the present embodiments, the media device responds to sector level access while files may be secured using the LBA addressing. A file may be transmitted to a media device through a network from a remote server via the digital appliance that the media device is connected to. The transmitted file may then have its access policy changed in order to be made available as desired by the file owner, using the dynamic security policy enforcer. The policy change of a file or the creation of a file for any policy usage does not require a different mode of file and/or data transmission other than the placing of a standard file in the media device. Processed data within the media device can be output directly to a user-readable file on the media device or directly to digital appliance. This data processing may include secured data as well as unsecured data.

The reader will see that this invention provides a method to use a single, standard file system to support the enforcement of several different usage policies in addition to the use of the media device for common file system usage. The fact that a single data area may be shared between common user files and files having different access policies, provides the flexibility to dynamically allocate the media device memory either for more user files or for more restricted access files. Once a media device is given to the user, the user can use the media device for storing and retrieving both restricted and non restricted files in a flexible manner, and the user does not need to reformat or lose any data. When a secure file exists in the user's media device, the user can see the existence of the file through the file system directory of the media device. The user can therefore fully understand the usage of his or her media.

Furthermore the dynamic policy enforcer for a media device has additional advantages in that:

(a) The media device with the dynamic security enforcer responds to sector level access thus allowing standard media device usage, while files may be secured using LBA addressing.

(b) A file with a changed access policy does not need to be transferred into or out of a separate location within the media device, or to be rewritten or sent in or out of the media device. Instead the file's access policy is changed by the dynamic policy enforcer. The file data may stay in place and only the file attributes are altered. This process simplifies and improves performance for changing the file security and access policy.

(c) Processed data within a media device can be output directly to a user-readable file on the media device. The data processed may include secured files as well as unsecured files.

(d) The media device can be given to the user without any protected files and apart from a small footprint, even without the allocation of non-volatile media for security policy housekeeping data. This allows the media device to be competitive with other media devices which do not include a policy enforcer, in that almost no memory is taken up by access policy related data.

(e) Although the internal file system structure anode table, directory table) exists and creates the necessity of managing additional file information, this situation which is merely holding an internal copy of user's single file system information is far simpler than managing an entire additional file system. In this particular case, no data management is being done, only the records of the file status and a copy of its existing LBA indexes are kept. This is very simple and straight forward, allowing the security policies to be handled independently of the digital appliance.

(f) The media device may report the original media device properties to the digital appliance, since the entire physical user media may be available to the digital appliance. No discrepancies between the reported accessible media and actual accessible media exist.

(g) The user is allowed to remove secure files to free up memory of the device. Thus the user is able to freely manage the contents of the memory device.

It is noted that the dynamic policy security enforcer and other parts may operate in different ways than explained; An LBA system is described but other forms of media addressing may be used such as (Head, Cylinder, Sector) and clusters; More than two policies may be implemented by the policy enforcer; the media device may be composed in a different manner than that described in FIG. 3; The Inode in FIG. 5 may include additional or different fields which allow a similar functionality to that required by the mode entry. An alternative to an mode and a directory table can be used to hold information necessary to keep track of secured files separate from digital appliance; Different manners of changing security policies may be applied to the embodiments of FIG. 6, FIG. 7 and FIG. 8. A media device may receive content through any number of ways other than that which is displayed in FIG. 9, such as by being connected through a mobile phone to a cellular network or other methods such as receiving data from a CD-ROM or DVD-ROM. A media device may include various other processing capabilities as well as dedicated processing units to process multimedia such as music, video etc., as well as processing encryption/decryption on a dedicated processing unit. A media device may be composed of several physical media devices. Other methods of bootstrapping the internal file table and directory index may be used, in handling policy enforced data files etc. There are various methods to allow this invention to operate in the future but the ability to implement the invention, such as the bootstrapping of the internal file table is also a part of this invention. The internal file table may access information in the internal user file system through the internal file system analyzer or through communication with the digital appliance, in whole or in part, and as the file is being processed internally. Some files may become accessible to the user following an introduction of a password or some other form of user identification.

While certain features of the invention have been illustrated and described herein, many modifications, substitutions, changes, and equivalents, may now occur to those of ordinary skill in the art. It is, therefore, to be understood that the appended claims are intended to cover all such modifications and changes as fall within the true spirit of the invention.

It is expected that during the life of this patent many relevant secured storage media devices and systems will be developed and the scope of the terms herein, particularly of the terms "autonomous data storage device" and "internal file management system", is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A file storage device for storing files sectorially for subsequent access, the device comprising:

a physical file storage for storing said files homogenously on certain part of said physical file storage, an externally direct-attached accessible interface for sectorially accessing said homogenously stored files through direct-attached storage commands, an internal inaccessible interface located above said externally direct-attached accessible interface to limit access to sectors of certain homogenously stored files from said externally-direct-attached accessible interface according to an indication of a file access restriction associated with a respective file of said certain homogenously stored files wherein said file storage device autonomously associates sectors of said respective file of said certain homogenously stored files with access restriction of said respective file of said certain homogenously stored files, and wherein an indication associated with a data portion is changed from unrestricted to restricted for access outside of said device and an at least partially encrypted data is at least partially decrypted in at least part of said data portion.

2. The autonomous file storage device of claim 1, wherein said internal inaccessible interface includes a plurality of access restriction policies for stored files said file storage device further comprising an internal processor capable of internally executing a program having an access restriction policy and process data having a matching access restriction policy to said program access restriction policy.

3. The autonomous file storage device of claim 1, wherein the accessibility status of sectors of a homogenously stored file through said direct-attached accessible interface is dynamically changed from unrestricted access file to restricted access file, and vice versa by changing access restriction of said homogenously stored file in said file storage device.

4. The autonomous file storage device of claim 3, wherein an at least partially encrypted unrestricted access file is dynamically changed to restricted access file said restricted access file is at least partially decrypted within sectors of said restricted access file in said file storage device having an internal processor configured for internally executing a program using said at least partially decrypted file thereby protecting execution of said program using said at least partially decrypted file protected from external access.

5. The autonomous file storage device of claim 3, wherein an unrestricted file configured for at least partial authentication is dynamically changed to restricted access file said restricted access file is at least partially authenticated within sectors of said restricted access file in said file storage device having an internal processor configured for internally executing a program using said at least partially authenticated file thereby protecting execution of said program using said at least partially authenticated file protected from external access.

6. The autonomous file storage device of claim 4, wherein said restricted access file includes code for executing said program internally in said file storage device.

7. The autonomous file storage device of claim 4, wherein said restricted access file includes data for executing said program internally in said file storage device.

8. The autonomous file storage device of claim 4, wherein said internal processor is at least partially inaccessible externally at least during execution of part of said program internally in said file storage device.

9. The autonomous file storage device of claim 4, wherein said internal program execution result is accessible through externally accessible interface.

10. The autonomous file storage device of claim 4, wherein said restricted access file is configured for at least partial authentication said restricted access file is at least partially authenticated prior to internally executing said program.

11. The autonomous file storage device of claim 1, wherein said file storage device is dynamically configured for allowing said direct-attached accessible interface access to sectors of restricted file by changing restriction policy of said restricted file.

12. The autonomous file storage device of claim 11, wherein said file storage device internally decrypts at least some data stored as encrypted data in said file storage device.

13. The autonomous file storage device of claim 5, wherein said restricted access file includes code for executing said program internally in said file storage device.

14. The autonomous file storage device of claim 5, wherein said internal processor is at least partially inaccessible externally at least during internal execution of part of said program.

15. The autonomous file storage device of claim 5, wherein said restricted access file is at least partially decrypted prior to internally executing said program.

16. The autonomous file storage device of claim 3, wherein an at least partially encrypted unrestricted access file is dynamically changed to restricted access file said restricted access file is at least partially decrypted within sectors of said restricted access file in said file storage device.

17. The autonomous file storage device of claim 3, wherein an unrestricted file configured for at least partial authentication is dynamically changed to restricted access file said restricted access file is at least partially authenticated within sectors of said restricted access file in said file storage device.

18. A method of interfacing between a file storage device for storing files, some of which have restricted access conditions, and an external device, the method comprising:
  a. storing said files homogenously on said file storage device,
  b. identifying permissions for sectorially accessing of said homogenously stored files as either unrestricted files or restricted access files,
  c. identifying permissions for sectors associated with said restricted access files according to said identified file permissions autonomously by said file storage device,
  d. allowing said external device direct-attached storage accessibility functionality for sectors of unrestricted files, whilst restricting accessibility functionality for sectors of restricted files according to said identified sectors permissions
  e. dynamically restricting access of at least part of externally accessible data portion by changing said identified permissions of said homogenously stored data from unrestricted to restricted for said data portion.

19. A method according to claim 18 wherein the accessibility to sectors of a file by said external device through direct-attached storage functionality is dynamically changed from restricted access file to unrestricted file, and vice versa by changing access restriction permission of said file in said file storage device.

20. A method according to claim 19 wherein an at least partially encrypted file is at least partially decrypted in at least part of said dynamically restricted file for protecting said at least partially decrypted file from external access.

21. A method according to claim 19 wherein an at least partially authenticated file is at least part of said dynamically restricted file for protecting said at least partially authenticated file from external access.

22. A method according to claim 20 wherein said at least partially decrypted file protected from external access is used for executing a program in a protected manner.

23. A method according to claim 21 wherein said at least partially authenticated file protected from external access is used for executing a program in a protected manner.

24. A method according to claim 18 wherein at least one at least partially restricted file is used for internally executing a program in a protected manner.

25. A method according to claim 18 wherein one or more sectors are grouped together as clusters identifying permissions for clusters associated with said restricted files and restricting access to clusters according to said identified clusters permissions.

26. A method of protecting memory of an autonomous device coupled to an external device, the method comprising:
 a. storing data homogenously on certain part of said memory,
 b. identifying permissions for sectorially accessing of said homogenously stored data as either unrestricted portions of data or restricted portions of data,
 c. identifying permissions for data units associated with said restricted access portions of data according to said identified permissions of stored data,
 d. allowing direct access to data units of unrestricted portions of data, whilst restricting access to sectors of said certain homogenously stored files of data units of restricted data according to said identified permissions for data units,
 e. dynamically restricting access of at least part of externally accessible data portion by changing said identified permissions of said homogenously stored data from unrestricted to restricted for said data portion,
 f. decrypting encrypted data in at least part of restricted data of said data portion.

27. A method according to claim 26 wherein a memory portion is at least partially authenticated in at least part of said dynamically restricted data portion for protecting said at least partially authenticated memory from external access.

28. A method according to claim 26 wherein said at least partially decrypted data portion protected from external access is used for executing a program in a protected manner.

29. A method according to claim 27 wherein said at least partially authenticated memory portion protected from external access is used for executing a program in a protected manner.

30. A method according to claim 26 wherein at least one at least partially restricted portion of data is used for executing a program in a protected manner.

31. A data protection device comprising:
 a physical memory for storing data homogenously on certain part of said physical memory,
 an external direct-attached accessible interface for sectorially accessing data units of said homogenously stored data, and
 an internal inaccessible interface located above said external direct-attached accessible interface to limit access to sectors of data units of certain homogenously stored data portions according to an indication associated with respective data portions having a data access restriction wherein said file storage device autonomously associates sectors of said respective file of said certain homogenously stored files with access restriction of said respective file of said certain homogenously stored files, and
 wherein an indication associated with a data portion is changed from unrestricted to restricted for access outside of said device and an at least partially encrypted data is at least partially decrypted in at least part of said data portion.

32. The data protection device of claim 31 further comprising a processing unit for executing a program in a protected manner using at least one at least partially limited access homogenously stored data portion.

33. The data protection device of claim 31, wherein a memory portion is at least partially authenticated in at least part of said data portion for protecting said at least partially authenticated memory portion from external access.

34. The data protection device of claim 31, wherein said at least partially decrypted data portion protected from external access is used for executing a program in a protected manner.

35. The data protection device of claim 33, wherein said at least partially authenticated memory portion protected from external access is used for executing a program in a protected manner.

* * * * *